US 12,088,981 B2
Sep. 10, 2024

(12) United States Patent
Kim et al.

(10) Patent No.: US 12,088,981 B2
(45) Date of Patent: Sep. 10, 2024

(54) DISPLAY APPARATUS

(71) Applicant: LG Display Co., Ltd., Seoul (KR)

(72) Inventors: Taehyung Kim, Paju-si (KR); Seulki Nam, Paju-si (KR); Minjin Lee, Paju-si (KR); Youngyoon You, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 717 days.

(21) Appl. No.: 17/237,586

(22) Filed: Apr. 22, 2021

(65) Prior Publication Data

US 2021/0345028 A1 Nov. 4, 2021

(30) Foreign Application Priority Data

Apr. 29, 2020 (KR) .................. 10-2020-0052519

(51) Int. Cl.
*H04R 1/02* (2006.01)
*H04N 5/64* (2006.01)

(52) U.S. Cl.
CPC ............. *H04R 1/028* (2013.01); *H04N 5/642* (2013.01)

(58) Field of Classification Search
CPC .... H04R 1/028; H04R 1/345; H04R 2499/15; H04R 7/04; H04R 11/02; H04R 1/20; H04R 9/025; G06F 1/182; G06F 1/1605; G02F 1/1333
See application file for complete search history.

(56) References Cited

U.S. PATENT DOCUMENTS

| | | | |
|---|---|---|---|
| 6,107,601 A | 8/2000 | Shimogama | |
| 2006/0187364 A1 | 8/2006 | Fukano | |
| 2013/0279730 A1 | 10/2013 | Tanaka | |
| 2014/0247959 A1 | 9/2014 | Yamanaka et al. | |
| 2015/0131836 A1 | 5/2015 | Hoshikawa | |
| 2016/0014367 A1 | 1/2016 | Yeo et al. | |
| 2016/0269832 A1 | 9/2016 | Nakamura et al. | |
| 2017/0280216 A1 | 9/2017 | Lee et al. | |
| 2018/0167724 A1 | 6/2018 | Jung et al. | |
| 2019/0037164 A1 | 1/2019 | Kim et al. | |
| 2019/0037165 A1 | 1/2019 | Lee et al. | |
| 2019/0149908 A1 | 5/2019 | Kim et al. | |
| 2020/0100022 A1 | 3/2020 | Shin et al. | |
| 2020/0092650 A1 | 5/2020 | Ham et al. | |
| 2021/0243529 A1 | 8/2021 | Ham et al. | |

FOREIGN PATENT DOCUMENTS

| | | |
|---|---|---|
| CN | 1825922 A | 8/2006 |
| CN | 108235193 A | 6/2018 |
| CN | 109308849 A | 2/2019 |
| CN | 109326236 A | 2/2019 |
| CN | 110913319 A | 3/2020 |

(Continued)

OTHER PUBLICATIONS

Office Action issued by the Japanese Patent Office Corresponding to JP Patent Application No. 2021-072525, dated Feb. 22, 2022.

(Continued)

*Primary Examiner* — Tuan D Nguyen

(74) *Attorney, Agent, or Firm* — Morgan, Lewis & Bockius LLP

(57) ABSTRACT

A display apparatus may include a display module including a display panel configured to display an image, a structure disposed on a rear surface of the display module, and a vibration generator disposed in the structure in nonparallel with the rear surface of the display module.

36 Claims, 12 Drawing Sheets

(56) References Cited

FOREIGN PATENT DOCUMENTS

| CN | 110933562 A | 3/2020 |
|---|---|---|
| JP | H11-104826 A | 4/1999 |
| JP | 2005110216 A | 4/2005 |
| JP | 2006237826 A | 9/2006 |
| JP | 2009081743 A | 4/2009 |
| JP | 3175661 U | 5/2012 |
| JP | 2014171049 A | 9/2014 |
| JP | 2015103962 A | 6/2015 |
| JP | 2018093469 A | 6/2018 |
| JP | 2020039107 A | 3/2020 |
| JP | 2020048194 A | 3/2020 |
| KR | 10-2016-0006416 A | 1/2016 |
| KR | 10-2019-0054431 A | 5/2019 |
| KR | 10-2020-0033597 A | 3/2020 |
| TW | 202013994 A | 4/2020 |

OTHER PUBLICATIONS

Office Action issued by the Taiwanese Patent Office corresponding to TW Patent Application No. 11120916510, dated Sep. 16, 2022.
Office Action dated Apr. 4, 2024 issued in corresponding Korean Patent Application No. 10-2020-0052519.
Office Action issued Jan. 17, 2024 for corresponding Chinese Patent Application No. 202110465019.3.

DISPLAY APPARATUS

CROSS-REFERENCE TO RELATED APPLICATIONS

This application claims the benefit of and priority to the Korean Patent Application No. 10-2020-0052519 filed on Apr. 29, 2020, the entirety of which is hereby incorporated by reference as if fully set forth herein.

TECHNICAL FIELD

The present disclosure relates to a display apparatus, and more particularly, to a display apparatus which includes a display module for outputting a sound.

DISCUSSION OF THE RELATED ART

Display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

Display apparatuses may include a display panel (or a display module) for displaying an image and a sound device for outputting a sound associated with the image.

However, in display apparatuses, because a sound output from a sound device may travel to a rearward or a downward direction of the display apparatus, sound quality may be degraded due to interference between sounds reflected from a wall and the ground. For this reason, it may be difficult to transfer an accurate sound, and the immersion experience of a viewer is reduced.

SUMMARY

Accordingly, embodiments of the present disclosure are directed to a display apparatus that substantially obviates one or more problems due to limitations and disadvantages of the related art.

The inventors have recognized problems of the display apparatuses described above and have performed various experiments so that, when a user in front of a display panel (or a display module) is watching an image, a traveling direction of a sound is a forward direction of the display panel. Thus, sound quality may be enhanced. Thus, through the various experiments, the inventors have invented a display apparatus having a new structure, which may generate a sound traveling in a forward region of the display panel, thereby enhancing sound quality.

An aspect of the present disclosure is to provide a display apparatus for improving sound quality and increasing an immersion experience of a viewer.

Another aspect of the present disclosure is to provide a display apparatus which generates a sound traveling in a forward direction of a display module.

Additional advantages and features of the disclosure will be set forth in part in the description that follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other of the inventive concepts, as embodied and broadly described, a display apparatus comprises a display module including a display panel configured to display an image, a structure on a rear surface of the display module, and a vibration generator configured to be disposed in the structure in nonparallel with the rear surface of the display module.

In another aspect, a display apparatus comprises a display module including a display panel configured to display an image, a first vibration generating module in a first rear region of the display module, and a second vibration generating module in a second rear region of the display module. Each of the first and second vibration generating modules comprises a vibration generator outputting a sound to a rear surface of the display module, and a structure on the rear surface of the display module to output the sound output from the vibration generator to one side of the display module.

The display apparatus according to some embodiments of the present disclosure may output a sound in a forward direction and a lateral direction of a display module.

The display apparatus according to some embodiments of the present disclosure may enhance a sound of a low-pitched sound band to a high-pitched sound band.

According to some embodiments of the present disclosure, a periphery thickness of a display apparatus may be reduced.

According to some embodiments of the present disclosure, the sound quality may be improved and the immersion experience of the viewer viewing the image may be increased.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory, and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles of the disclosure.

Figure 1:
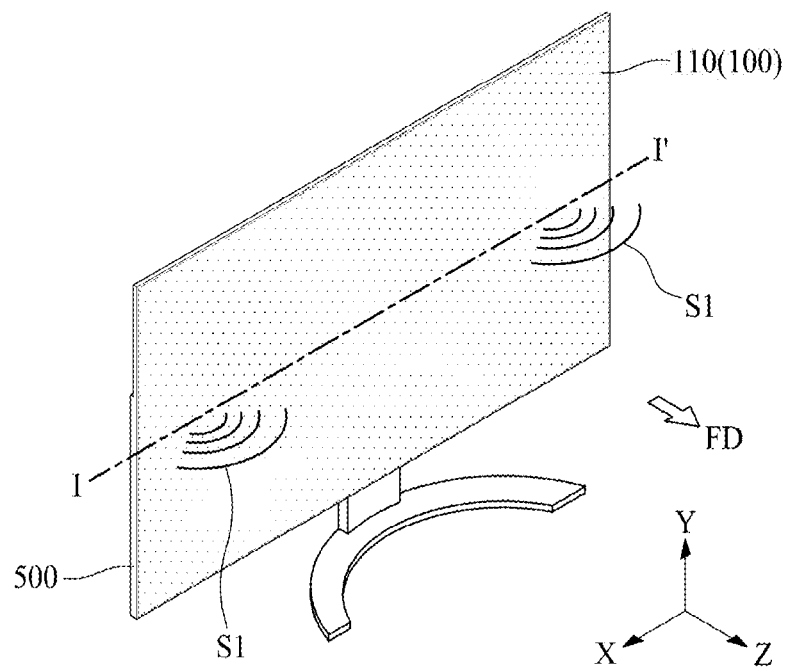
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus according to an embodiment of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

A display apparatus according to an embodiment of the present disclosure may include a vibration generating device (or a vibration generating apparatus). When the display apparatus is configured with a sound generating device which is the vibration generating device, there is a problem where it is difficult to secure a sound of a high-pitched sound band, due to complicated structures of the display apparatus. In order to solve the problem, the display apparatus according to an embodiment of the present disclosure may further include a piezoelectric vibration device including a piezoelectric material or a piezoelectric device having a piezoelectric effect (or an inverse piezoelectric characteristic) where an output of the high-pitched sound band is strong. When the piezoelectric vibration device is provided in the display apparatus for outputting a sound, the cost of the display apparatus increases, and a separate element for implementing a sound signal in the piezoelectric vibration device is needed, causing an increase in cost. Therefore, the inventors have performed various experiments for realizing a sound of the high-pitched sound band without configuring a piezoelectric vibration device in a display apparatus. Through the various experiments, the inventors have invented a display apparatus having a new structure. This will be described below.

Figure 2:
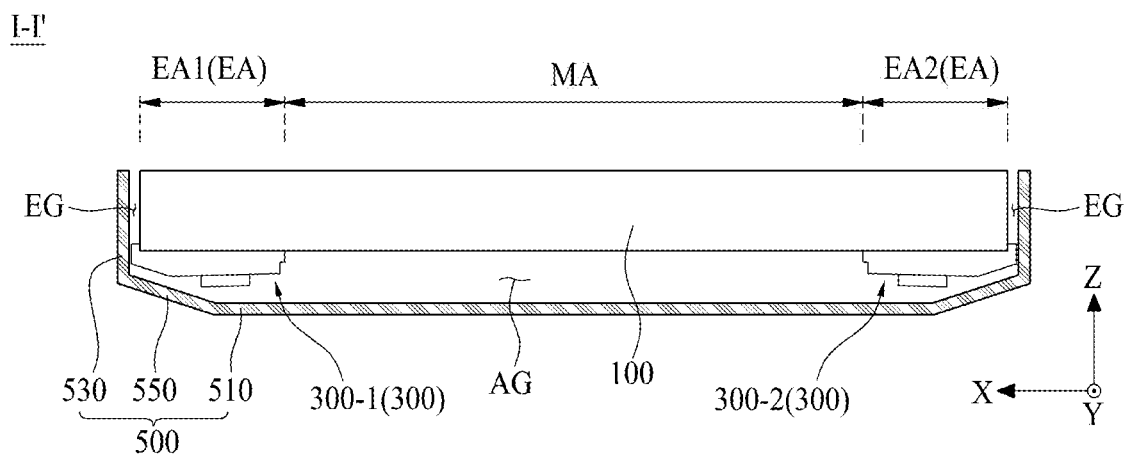
FIG. 2 is a cross-sectional view taken along line I-I' illustrated in FIG. 1.

FIG. 1 illustrates a display apparatus according to an embodiment of the present disclosure, and FIG. 2 is a cross-sectional view taken along line I-I' illustrated in FIG. 1.

With reference to FIGS. 1 and 2, the display apparatus according to an embodiment of the present disclosure may output a sound S1 based on a vibration of a display module 100 configured to display an image. For example, the image may include an electronic image or a digital image. For example, in the display apparatus, the display module 100 may be vibrated by a vibration generating device (or a sound generating device or a sound generator) to generate the sound S1. The sound S1 generated based on the vibration of the display module 100 may be outputted in a forward direction FD of a screen of the display apparatus. Therefore, the display apparatus according to an embodiment of the present disclosure may output the sound S1 in the forward direction FD of the screen of the display apparatus using the display module 100 as a vibration plate for generating a sound or for outputting a sound, and thus, may transfer the sounds, thereby improving sound quality and increasing an immersion experience of a viewer watching an image.

A display apparatus according to an embodiment of the present disclosure may include a display module 100 and a vibration generating device 300.

The display module 100 may be configured to display an image. The display module 100 may be configured to display an image and simultaneously to output a sound in response to a vibration of the vibration generating device 300. The display module 100 may be configured to output a sound in response to a vibration of the vibration generating device 300 in a state which does not display an image.

The display module 100 may be a liquid crystal display module, but embodiments of the present disclosure are not limited thereto. For example, the display module 100 may be a display module such as a light emitting display module, an electrophoretic display module, a micro light emitting diode display module, an electro-wetting display module, or a quantum dot light emitting display module.

The display module 100 according to an embodiment of the present disclosure may include a display panel configured to display an image. The display panel may be a liquid crystal display panel, but embodiments of the present disclosure are not limited thereto. For example, the display panel may be a display panel such as a light emitting display panel, an electrophoretic display panel, a micro light emitting diode display panel, an electro-wetting display panel, or a quantum dot light emitting display panel.

A rear surface (or a backside surface) of a display module 100 may include a middle region MA and a periphery region EA. For example, the rear surface of the display module 100 may be divided into the middle region (or a rear middle region) MA and the periphery region (or a rear periphery region) EA.

The vibration generating device 300 may be provided on a rear surface (or a rear region) of the display module 100. For example, the vibration generating device 300 may be disposed along a rear periphery region EA of the display module 100. The vibration generating device 300 may output a sound to the rear region of the display module 100, or may output a sound pressure level to the rear region of the display module 100. The vibration generating device 300 according to an embodiment of the present disclosure may vibrate based on a sound signal (or a voice signal) input from the outside to generate a sound and may output the generated sound in a forward direction FD and a lateral direction of the display module 100. For example, in response to the sound signal, the vibration generating device 300 may vibrate the rear periphery region EA of the display module 100 to generate a sound pressure level and may vibrate the rear periphery region EA of the display module 100 based on the generated sound pressure level to generate a sound S1. Also, a sound generated based on a vibration of the vibration generating device 300 may be reflected (or diffracted) in the lateral direction of the display module 100, and then, may be output in the forward direction FD of the display module 100. For example, a sound based on the sound pressure level output from the vibration generating device 300 may be output in the forward direction FD and the lateral direction of the display module 100.

The vibration generating device 300 according to an embodiment of the present disclosure may include at least one vibration generating module 300-1 and 300-2 disposed along the rear periphery region EA of the display module 100. The vibration generating device 300 according to an embodiment of the present disclosure may include a first vibration generating module 300-1 and a second vibration generating module 300-2 disposed along the rear periphery region EA of the display module 100.

The first and second vibration generating modules 300-1 and 300-2 may be disposed to be symmetrical or asymmetrical with respect to a first direction X (or a widthwise direction) of the display module 100. For example, the first and second vibration generating modules 300-1 and 300-2 may be disposed to be symmetrical or asymmetrical with a center of the display module 100 with respect to the first direction X (or the widthwise direction) of the display module 100. For example, the first vibration generating module 300-1 may be disposed on a first rear periphery region EA1 among the rear periphery region EA of the display module 100. The second vibration generating module 300-2 may be disposed on a second rear periphery region EA2 among the rear periphery region EA of the display module 100. For example, when viewed from the forward direction of the display module 100, the first rear periphery region EA1 may be a left periphery region (or a right periphery region) of the display module 100, and the second rear periphery region EA2 may be a right periphery region (or a left periphery region) of the display module 100, but embodiments of the present disclosure are not limited thereto.

The display apparatus according to an embodiment of the present disclosure may further include a first supporting member 500 disposed on the rear surface of the display module 100.

The first supporting member 500 may include one or more of a plastic material, a metal material, or glass material, but embodiments of the present disclosure are not limited thereto. For example, the first supporting member 500 may be referred to as a rear cover, a system rear cover, a system housing, a set cover, a rear set cover, an outermost set cover, a product cover, or an outermost product cover, but embodiments of the present disclosure are not limited thereto.

The first supporting member 500 may be configured to accommodate the display module 100 where the vibration generating device 300 is disposed, or may be configured to cover a rear surface of the display module 100 where the vibration generating device 300 is disposed. Also, the first supporting member 500 may be configured to surround one or more side surfaces of the display module 100. For example, the first supporting member 500 may include a sound guide structure which guides a sound or a sound pressure level, generated based on a vibration of the vibration generating device 300, in a forward direction or a lateral direction of the display module 100.

The first supporting member 500 according to an embodiment of the present disclosure may include a first portion 510 and a second portion 530. The first portion 510 may be a rear cover portion. The second portion 530 may be a side cover portion.

The first portion 510 may cover a rear surface (or a rear region) of the display module 100. The first portion 510 may be configured to cover the rear surface (or the rear region) or the entire display module 100. For example, the first portion 510 may be spaced apart from the rear surface of the display module 100 by a predetermined interval (or distance). An air gap AG may be disposed between the first portion 510 and the rear surface of the display module 100. The air gap AG may be a first gap or a first space.

The second portion 530 may be configured to surround a side surface of the display module 100. The second portion 530 may be connected to the first portion 510. The second portion 530 may be spaced apart from one side or the side surface of the display module 100 by a predetermined interval (or distance) so as not to directly contact the one side or the side surface of the display module 100. The second portion 530 may be a sound guide structure which is implemented to guide a sound or a sound pressure level, generated based on a vibration of the vibration generating device 300, in the forward direction FD of the display module 100. For example, the second portion 530 may be bent from the first portion 510 in a thickness direction Z of the display module 100. For example, the second portion 530 may be referred to as a sound guide or a sound guide member, but embodiments are not limited thereto.

The first supporting member 500 according to an embodiment of the present disclosure may further include a third portion 550 between the first portion 510 and the second portion 530. The third portion 550 may be an inclined portion or a slope portion. The third portion 550 may be inclined or sloped in a direction from the first portion 510, overlapping a periphery of the vibration generating device 300, to the second portion 530. For example, an angle between the first portion 510 and the third portion 550 may be 45 degrees or less. Therefore, the first supporting member 500 may include the third portion 550 which overlaps the periphery of the vibration generating device 300, and thus, a thickness of a periphery portion of the display apparatus overlapping the vibration generating device 300 may decrease.

The display apparatus according to an embodiment of the present disclosure may further include an edge gap EG implemented between the first supporting member 500 and the one side or the side surface of the display module 100. The edge gap EG may be a border gap, a border space, a second gap, a sound space, or a second space, but the terms are not limited thereto.

The edge gap EG may be provided between the side surface of the display module 100 and the second portion 530 of the first supporting member 500. The edge gap EG may be about 1 mm to about 3 mm and may be a distance (or a shortest distance) between the second portion 530 of the first supporting member 500 and the one side or the side surface of the display module 100, but embodiments are not limited thereto. When the edge gap EG is greater than about 3 mm, a bezel width of the display apparatus may increase. The edge gap EG may be a sound emission space (or a sound outputting portion) where a sound, which is generated based on a vibration of the vibration generating device 300 and is output in a lateral direction of the vibration generating device 300, is output in the forward direction of the display module 100. For example, the sound generated based on the vibration of the vibration generating device 300 may be repeatedly reflected (or diffracted) between the rear surface of the display module 100 and the vibration generating device 300 and may be output to the edge gap EG in a direction (or a diagonal direction) between the lateral direction of the vibration generating device 300 and the forward direction of the display module 100. The sound output toward the edge gap EG may be output in the forward direction of the display module 100 through the edge gap EG, or may be reflected (or diffracted) once or more between the one side or the side surface of the display module 100 and the second portion 530 of the first supporting member 500 and may be output in the forward direction of the display module 100. For example, the sound output through the edge gap EG may be referred to as an edge sound, a border sound, a periphery sound, or a reinforcement sound, but embodiments are not limited thereto.

Therefore, the display apparatus according to an embodiment of the present disclosure may output a sound S1 based on a vibration of the display module 100 based on a sound which is output from the vibration generating device 300 disposed in the rear periphery region EA of the display module 100. In the display apparatus according to an embodiment of the present disclosure, at least a portion of a sound of a high-pitched sound band in sounds output from the vibration generating device 300 may be reflected (or diffracted) in the lateral direction of the display module 100, between the display module 100 and the vibration generating device 300, and may be output in the forward direction FD of the display module 100 through the edge gap EG. Accordingly, in the display apparatus according to an embodiment of the present disclosure, a sound characteristic of the high-pitched sound band may be enhanced based on a sound which is output in the forward direction FD of the display module 100.

Figure 3:
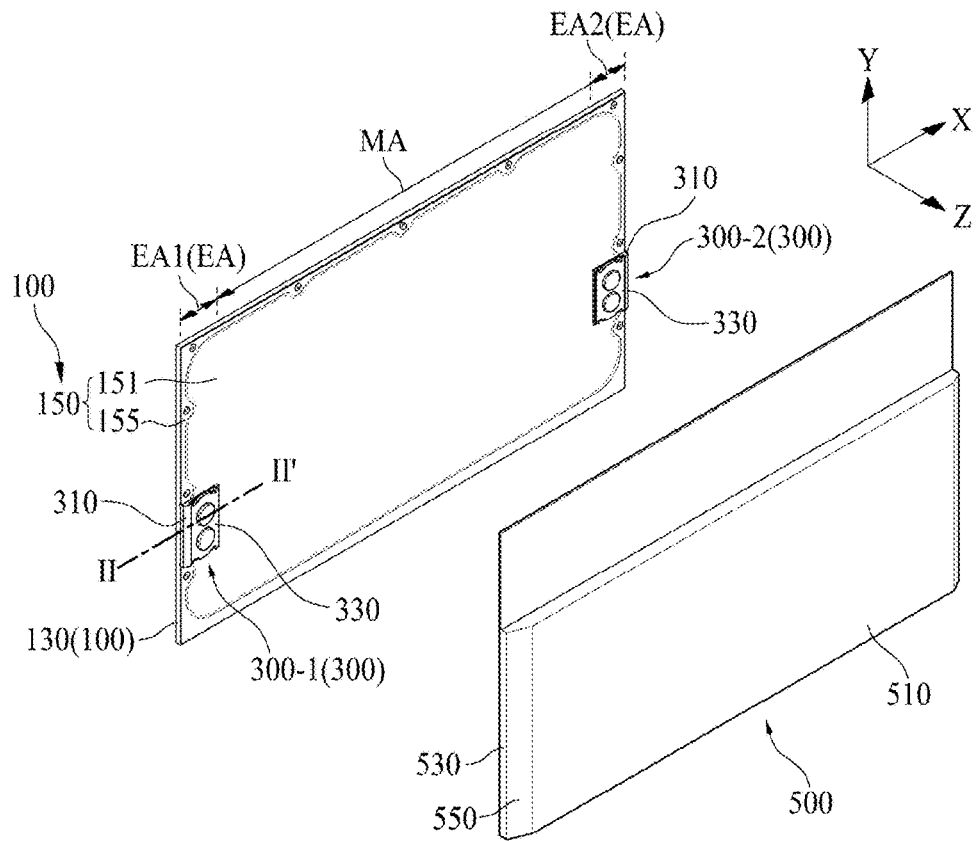
FIG. 3 is an exploded view of a display apparatus according to an embodiment of the present disclosure.
Figure 4:
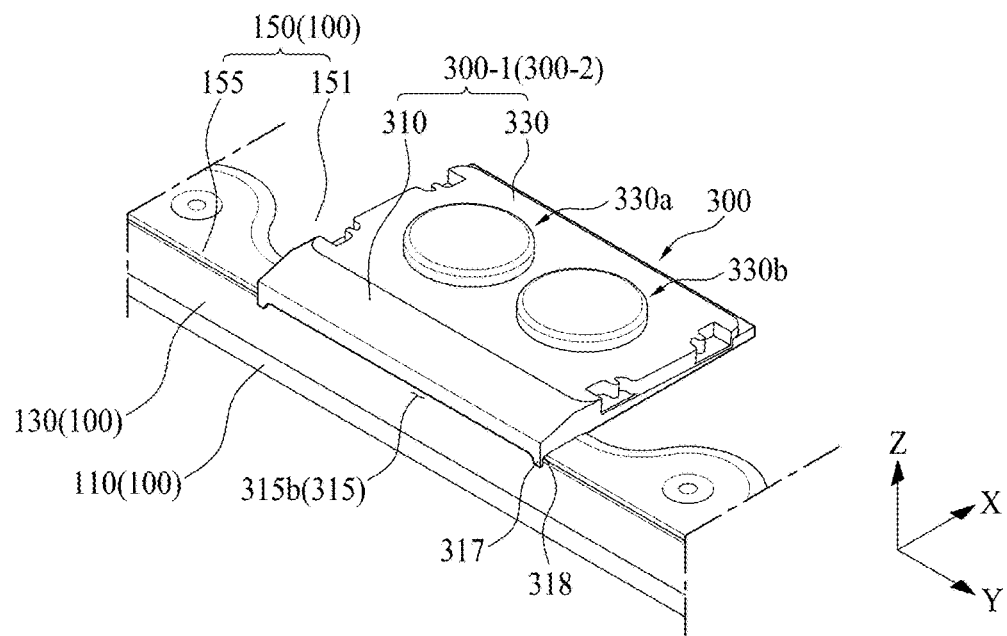
FIG. 4 illustrates a vibration generating device disposed in a second supporting member illustrated in FIG. 3.
Figure 5:
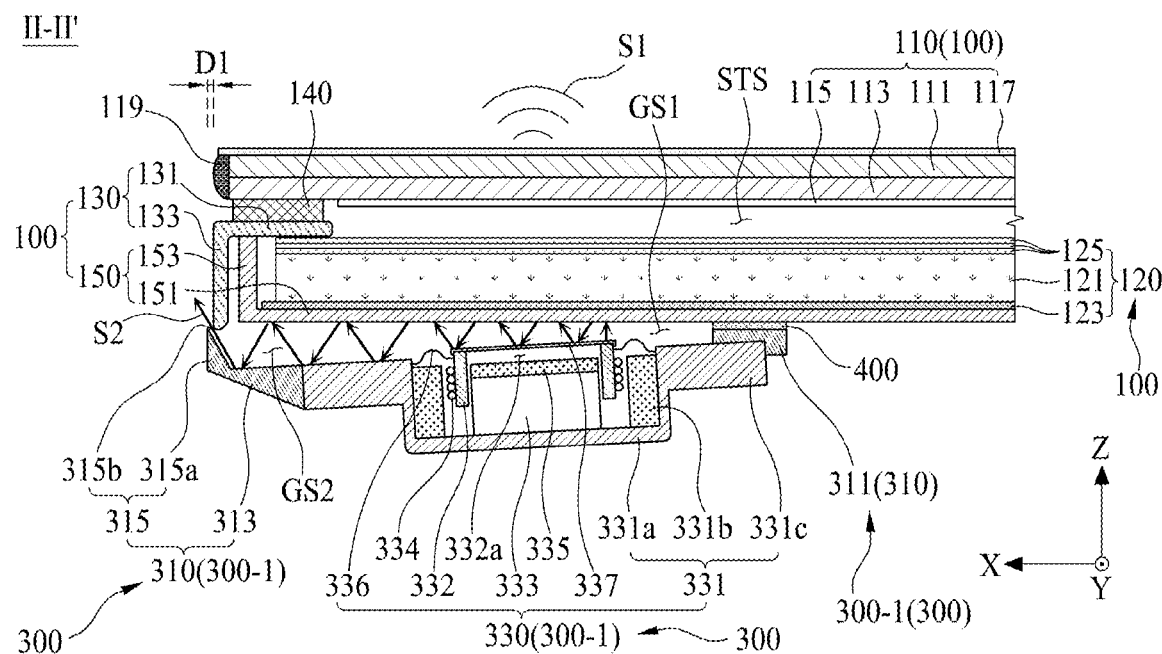
FIG. 5 is a cross-sectional view taken along line II-II' illustrated in FIG. 3.

FIG. 3 is an exploded view of a display apparatus according to an embodiment of the present disclosure, FIG. 4 illustrates a vibration generating device disposed in a second supporting member illustrated in FIG. 3, and FIG. 5 is a cross-sectional view taken along line II-II' illustrated in FIG. 3.

With reference to FIGS. 3 to 5, in the display apparatus according to an embodiment of the present disclosure, a display module 100 may include a display panel 110, a panel guide 130, and a second supporting member 150.

The display panel 110 may be a liquid crystal display panel, but embodiments of the present disclosure are not limited thereto. For example, the display panel 110 may be a display panel such as a light emitting display panel, an electrophoretic display panel, a micro light emitting diode display panel, an electro-wetting display panel, or a quantum dot light emitting display panel.

When the display panel 110 may be a liquid crystal display panel, the display module 100 may further include a backlight part 120 disposed between the display panel 110 and the second supporting member 150.

The display panel 110 according to an embodiment of the present disclosure may include a first substrate 111, a second substrate 113, a first polarization member 117, and a second polarization member 115.

The first substrate 111 may be an upper substrate or a thin film transistor (TFT) array substrate and may include a pixel array (or a display part or a display area) including a plurality of pixels which are respectively provided in a plurality of pixel areas formed at intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate 111 may further include a pad part provided at a first periphery (or a first non-display part) thereof and a gate driving circuit provided at a second periphery (or a second non-display part) thereof.

The pad part may transfer a signal, supplied from the outside, to the pixel array and/or the gate driving circuit. For example, the pad part may include a plurality of data pads connected to a plurality of data lines through a plurality of data link lines and a plurality of gate input pads connected to the gate driving circuit through gate control signal lines. For example, a first periphery of the first substrate 111 including the pad part may protrude to a side surface corresponding to a first periphery of the lower substrate 113, and the pad part may be exposed in a rearward direction toward the second supporting member 150. For example, a size of the first substrate 111 may be greater than that of the lower substrate 113, but embodiments of the present disclosure are not limited thereto.

The gate driving circuit according to an embodiment of the present disclosure may be embedded (or integrated) into a second periphery of the first substrate 111 and may be connected to the plurality of gate lines. For example, the gate driving circuit may be implemented with a shift register including a transistor, which is formed through the same process as the TFT provided in the pixel area. According to another embodiment of the present disclosure, the gate driving circuit may be implemented as an integrated circuit (IC) and may be included in a panel driving circuit, without being embedded into the first substrate 111.

The second substrate 113 may be a lower substrate or a color filter array substrate and may include a pixel pattern, including an opening area overlapping the pixel area formed in the first substrate 111, and a color filter layer formed in the opening area. The second substrate 113 according to an embodiment of the present disclosure may have a size which is smaller than that of the first substrate 111, but embodiments of the present disclosure are not limited thereto. For example, the second substrate 113 may overlap a portion other than the first periphery of the first substrate 111. The second substrate 113 may be bonded or attached to a portion other than the first periphery of the first substrate 111 with a liquid crystal layer therebetween using a sealant.

The liquid crystal layer may be interposed between the first substrate 111 and the second substrate 113 and may include a liquid crystal including liquid crystal molecules where an alignment direction thereof is changed based on an electric field generated by the common voltage and a data voltage applied to a pixel electrode for each pixel.

The second polarization member 115 may be a lower polarization member and may be attached on a lower surface of the second substrate 113 and may polarize light which is incident from the backlight part 120 and travels to the liquid crystal layer.

The first polarization member 117 may be an upper polarization member and may be attached on an upper surface of the first substrate 111 and may polarize light which passes through the first substrate 111 and is output to the outside.

The display panel 110 according to an embodiment of the present disclosure may drive the liquid crystal layer based on an electric field which is generated in each pixel by the data voltage and the common voltage applied to each pixel, and thus, may display an image based on light passing through the liquid crystal layer.

In the display panel 110 according to an embodiment of the present disclosure, the first substrate 111 implemented as the TFT array substrate may configure an image display surface, and thus, a whole front surface of the display panel 110 may be exposed at the outside without being covered by a separate mechanism.

According to another embodiment of the present disclosure, in the display panel 110, the first substrate 111 may be implemented as the color filter array substrate, and the second substrate 113 may be implemented as the TFT array substrate. For example, the display panel 110 according to another embodiment of the present disclosure may have a type where an upper portion and a lower portion of the display panel 110 according to an embodiment of the present disclosure are reversed therebetween. For example, a pad part of the display panel 110 according to another embodiment of the present disclosure may be covered by a separate mechanism or structure.

The display module 100 according to an embodiment of the present disclosure may further include a buffer member 119. The buffer member 119 may be formed to surround at least one or more of side surfaces of the display panel 110. For example, the buffer member 119 may be formed to cover each side surface and each corner of the display panel 110.

The buffer member 119 may protect the side surfaces of the display panel 110 from an external impact, or may prevent light leakage through the side surfaces of the display panel 110. The buffer member 119 according to an embodiment of the present disclosure may include a silicone-based sealant or ultraviolet (UV)-curable sealant (or resin). For example, the buffer member 119 may include a colored resin or a light blocking resin for preventing leakage of light through a side surface.

A portion of an upper surface of the buffer member 119 according to an embodiment of the present disclosure may be covered by the first polarization member 117. An attachment surface between the buffer member 119 and the first substrate 111 or a boundary portion between the buffer member 119 and the first substrate 111 may be concealed by an extension portion of the first polarization member 117, and thus, may not be exposed in a forward portion of the display apparatus. For example, the extension portion of the first polarization member 117 extends long from a side surface corresponding to an outer surface of the first substrate 111 to cover a portion of a front surface of the buffer member 119 and is attached on the portion of the front surface of the buffer member 119. When the buffer member 119 is not provided, the front surface of the display panel 110 may not be covered by a separate mechanism and may be exposed in the forward portion of the display apparatus, and due to this, the light leakage at the side surface of the display panel 110 may occur. Therefore, in a display apparatus having a structure where the front surface or the whole front surface of the display panel 110 is exposed in the forward portion to remove or minimize a bezel width of the display apparatus, the buffer member 119 may be configured to prevent the light leakage at the side surface of the display panel 110 and to protect the side surfaces of the display panel 110. But embodiments of the present disclosure are not limited thereto, and the buffer member 119 may be omitted.

The backlight part 120 may be disposed on the rear surface of the display panel 110 and may irradiate light onto the rear surface of the display panel 110. The backlight part 120 according to an embodiment of the present disclosure may include a light guide plate 121, a light source part, a reflective sheet 123, and an optical sheet part 125.

The light guide plate (or a light guide member) 121 may be disposed on the second supporting member 150 to overlap the display panel 110 and may include a light incident surface provided at least one side thereof. The light guide plate 121 may include a light-transmitting plastic or glass material. The light guide plate 121 may travel (or output) light, which is incident through the light incident surface from the light source part, to the display panel 110. For example, the light guide plate 121 may be referred to as a light guide member, or a flat or plane light source, but embodiments of the present disclosure are not limited thereto.

The light source part may irradiate light onto the light incident surface provided in the light guide plate 121. The light source part may be disposed at the second supporting member 150 to overlap a first periphery of the display panel 110. The light source part according to an embodiment of the present disclosure may include a plurality of light emitting diodes which are mounted on a light-source printed circuit board (PCB) and irradiate lights onto the light incident surface of the light guide plate 121.

The reflective sheet 123 may be disposed at the second supporting member 150 to cover a rear surface of the light guide plate 121. The reflective sheet 123 may reflect light, which is incident from the light guide plate 121, to the light guide plate 121 to minimize the loss of the light.

The optical sheet part 125 may be disposed on a front surface of the light guide plate 121 and may enhance a luminance characteristic of light output from the light guide plate 121. The optical sheet part 125 according to an embodiment of the present disclosure may include a diffusive sheet, a first prism sheet, and a second prism sheet. For example, the optical sheet part 125 may be configured as one layer including the diffusive sheet, the first prism sheet, and the second prism sheet. But embodiments of the present disclosure are not limited thereto. For example, the optical sheet part 125 may be configured by a stacked combination of one or more sheets among a diffusive sheet, a prism sheet, a dual brightness enhancement film, and a lenticular sheet, or may be configured with one composite sheet having a light diffusing function and a light collecting function.

The panel guide (or panel supporting part) 130 may be disposed at a rear periphery region of the display panel 110. The panel guide 130 may support a rear periphery region EA of the display panel 110. The panel guide 130 may be supported by or accommodated into the second supporting member 150 to overlap the rear periphery region EA of the display panel 110. The panel guide 130 may be disposed under the rear periphery region of the display panel 110 not to protrude to the outside of each side surface of the display panel 110.

The panel guide 130 according to an embodiment of the present disclosure may include a guide frame (or panel supporting frame) 131 and a guide side portion (or a guide sidewall) 133. For example, the panel guide 130 may have a cross-sectional structure having a ¬-shape or a Γ-shape on the based on a coupling or connection structure of the guide frame 131 and the guide side portion 133, but embodiments of the present disclosure are not limited thereto.

The guide frame 131 may be coupled or connected to the rear periphery region EA of the display panel 110 and may be supported by the second supporting member 150. For example, the guide frame 131 may have a tetragonal band (or perimeter or belt) shape including an opening portion overlapping a middle region MA, other than the rear periphery region EA, of the display panel 110, but embodiments of the present disclosure are not limited thereto. The guide frame 131 may have a size equal to or smaller than that of the display panel 110 not to protrude to the outside of each side surface of the display panel 110. For example, the opening portion of the guide frame 131 may have a size which is equal to or greater than that of the pixel array (or the display portion) provided in the display panel 110.

The guide frame 131 may directly contact an uppermost surface of the backlight parte 120 (for example, an uppermost surface of the optical sheet part 125), or may be spaced apart from the uppermost surface of the optical sheet part 125 by a certain distance.

The guide side portion 133 may be connected to the guide frame 131 and may surround one side (or portion) or the side surface of the second supporting member 150. For example, the guide side portion 133 may be bent from the guide frame 131 to the side surfaces of the second supporting member 150 and may surround the side surfaces of the second supporting member 150 or may be surrounded by the side surfaces of the second supporting member 150. The guide side portion 133 may be surrounded by the first supporting member 500. For example, the guide side portion 133 may be surrounded by the second portion 530 of the first supporting member 500.

The panel guide 130 according to an embodiment of the present disclosure may include a plastic material, a metal material, or a mixed material of a plastic material and a metal material, but embodiments of the present disclosure are not limited thereto. For example, the panel guide 130 may act as a vibration transfer member which transfers a sound vibration, generated by the vibration generating device 300, to the periphery region EA of the display panel 110. Therefore, the panel guide 130 may transfer the sound vibration, generated by the vibration generating device 300, to the display panel 110 without being lost, in a state of maintaining stiffness of the display panel 110. For example, the panel guide 130 may include a metal material for transferring the sound vibration, generated by the vibration generating device 300, to the display panel 110 without being lost, in a state of maintaining stiffness of the display panel 110, but embodiments of the present disclosure are not limited thereto.

The panel guide 130 according to an embodiment of the present disclosure may be disposed at the rear periphery region EA of the display panel 110. The panel guide 130 may be coupled or connected to the rear periphery region EA of the display panel 110 by a first connection member 140.

The first connection member 140 may be disposed between the rear periphery region EA of the display panel 110 and the guide frame 131 of the panel guide 130 and may dispose or couple the display panel 110 at the panel guide 130. The first connection member 140 of the present disclosure may include an acryl-based adhesive member or a urethane-based adhesive member, but embodiments of the present disclosure are not limited thereto. For example, the first connection member 140 may include the acryl-based adhesive member which is relatively better in adhesive force and hardness than the urethane-based adhesive member so that the vibration of the panel guide 130 can be well transferred to the display panel 110. For example, the first connection member 140 may include a double-sided foam adhesive pad having an acryl-based adhesive layer, or an acryl-based adhesive resin curing layer.

A front surface of the first connection member 140 according to an embodiment of the present disclosure may be disposed at the second substrate 113 or the second polarization member 115 of the display panel 110. The first connection member 140 may be directly coupled or connected to a rear periphery region EA of the second substrate 113 to enhance an adhesive force between the first connection member 140 and the display panel 110. For example, the first connection member 140 may be attached on the rear periphery region EA of the second substrate 113 and may surround a side surface of the second polarization member 115, thereby preventing light leakage of the side surface from occurring in the second polarization member 115.

The first connection member 140 may have a certain thickness (or height). So, the first connection member 140 may provide a sound transfer space STS between the display panel 110 and the backlight part 120. The first connection member 140 according to an embodiment of the present disclosure may be provided at a four-side-closed shape or a closed loop shape on the guide frame 131 of the panel guide 130, but embodiments of the present disclosure are not limited thereto.

For example, the first connection member 140 may provide the closed sound transfer space STS between a rearmost surface of the display panel 110 and an uppermost surface of the backlight part 120 which face each other with the opening portion of the panel guide 130 therebetween, thereby preventing or minimizing the leakage (or loss) of a sound pressure transferred to the sound transfer space STS. The sound transfer space STS may also act as a sound pressure generating space where a sound pressure level is generated based on a vibration of the backlight part 120 or a panel vibration space which enables a vibration of the display panel 110 to be smoothly performed.

The second supporting member 150 may be disposed at the rear surface of the display module 100. The second supporting member 150 may be configured to be disposed on a rearmost surface of the display module 100 to support the panel guide 130. Also, the second supporting member 150 may support the panel guide 130 and may support the backlight part 120. Also, the second supporting member 150 may support the vibration generating device 300. For example, the second supporting member 150 may be a supporting cover, a bottom cover, a cover bottom, an internal cover, or an internal structure.

The second supporting member 150 according to an embodiment of the present disclosure may act as a vibration plate and may include a metal material, a metal alloy material, or a nonferrous metal material, but embodiments are not limited thereto.

According to an embodiment of the present disclosure, the second supporting member 150 may include one or more material among an iron (Fe), an aluminum (Al), a magnesium (Mg), a Mg alloy, a magnesium-lithium (Mg—Li) alloy, an Al alloy, and an electroplating steel, but embodiments are not limited thereto. For example, the electroplating steel may be electrolytically galvanized steel sheet, electrogalvanized coil, or electrogalvanized iron.

According to an embodiment of the present disclosure, when the second supporting member 150 includes a material including nonferrous metal, a sound of a low-pitched sound band of the vibration generating device 300 may be more enhanced. For example, when the second supporting member 150 includes ferrous metal, the loss of a vibration may occur due to a magnetic field of the vibration generating device 300, and thus, a sound characteristic of the vibration generating device 300 may be reduced. For example, the low-pitched sound band may be 200 Hz or less, but embodiments are not limited thereto.

The second supporting member 150 according to an embodiment of the present disclosure may include a first portion 151, which implements the rear surface of the display module 100, and a second portion 153 disposed in a periphery region of the first portion 151. The second portion 153 may support the panel guide 130.

The first portion 151 may be disposed to cover a rear surface of the backlight part 120 of the display module 100. The first portion 151 may support the backlight part 120. The first portion 151 may be configured to include a plate structure. The first portion 151 may support the backlight part 120 of the display module 100 and may support the vibration generating device 300. For example, the first portion 151 may contact (or directly contact) a rear surface of the reflective sheet 123, and thus, may transfer a sound vibration, generated based on a vibration of the vibration generating device 300, to the reflective sheet 123 of the backlight part 120.

The first portion 151 may include a middle region MA, corresponding to (overlapping) a middle region of the display module 100, and a periphery region EA corresponding to (overlapping) the rear periphery region EA of the display module 100. For example, the first portion 151 may be referred to as a bottom portion, a lower portion, a rear portion, a supporting plate, a flat plate, a plate structure, or a cover plate, but embodiments are not limited thereto.

The second portion 153 may be bent from a periphery of the first portion 151 and may support the panel guide 130. The second portion 153 may provide a backlight accommodation space on the first portion 151 and may surround one or more of side surfaces of the backlight part 120 accommodated into (or supported by) the backlight accommodation space. The second portion 153 may transfer a sound vibration, generated in the first portion 151 by the vibration generating device 300, to the panel guide 130. For example, the second portion 153 may be referred to as a side portion, a side surface portion, a sidewall portion, a supporting sidewall, a sidewall structure, or a cover sidewall, but embodiments are not limited thereto.

The second portion 153 may be surrounded by the panel guide 130. For example, the second portion 153 may be surrounded by a guide side portion 133 of the panel guide 130.

The second supporting member 150 according to an embodiment of the present disclosure may further include a third portion 155. The third portion 155 may reinforce the stiffness of the second supporting member 150 and thus may be a reinforcement portion or a stiffness reinforcement portion, but embodiments are not limited thereto.

The third portion 155 according to an embodiment of the present disclosure may be disposed between the first portion 151 and the second portion 153. For example, the third portion 155 may be provided in a region (or a connection region) where the first portion 151 intersects with the second portion 153. For example, the third portion 155 may be provided in a periphery region EA of the first portion 151. For example, the third portion 155 may protrude in a rearward direction to include an inclined surface which is inclined from one side or an end of the first portion 151. When the second supporting member 150 includes the third portion 155, the second portion 153 may be connected to an end of the third portion 155. For example, the second portion 153 may be connected to one side of the third portion 155.

According to another embodiment of the present disclosure, the first portion 151 of the second supporting member 150 may include a cross-sectional structure having a concavely curved shape. The second supporting member 150 may support the backlight part 120 and the panel guide 130 in a curved shape which is concavely bent. The display panel 110 may be bent in a concavely curved shape and may be supported by the panel guide 130. Therefore, when the first portion 151 of the second supporting member 150 has a cross-sectional structure having a concavely curved shape, an internal air gap may be provided between the light guide plate 121 and the reflective sheet 123 of the backlight part 120 and may act as a sound box. Accordingly, a sound characteristic of a low-pitched sound band which is generated in the display module 100 based on a vibration of the vibration generating device 300 may be enhanced. For example, the second supporting member 150 including a cross-sectional structure having a concavely curved shape may be applied to a curved display apparatus.

The vibration generating device 300 according to an embodiment of the present disclosure may include first and second vibration generating modules 300-1 and 300-2 which are disposed in a rear region of the display module 100.

The first vibration generating module 300-1 may be disposed at a first rear periphery region EA1 of the display module 100. For example, the first vibration generating module 300-1 may be disposed at (or coupled to) a first rear periphery region EA1 of the second supporting member 150 which corresponds to (or overlaps) the first rear periphery region EA1 of the display module 100.

The first vibration generating module 300-1 may be configured to vibrate based on a sound signal to output a sound (or a sound wave) to a first rear periphery region EA1 (or a left periphery region) among the periphery region EA of the display module 100. A sound generated by the first vibration generating module 300-1 may be propagated (or transferred) to the first periphery region EA1 among the periphery region EA of the display module 100 to vibrate the first periphery region EA1 of the display module 100, and thus, may generate a sound S1 which is output to a forward portion of the display module 100. Also, at least a portion S2 of a sound having a high-pitched sound band among sounds generated by the first vibration generating module 300-1 may be reflected in the lateral direction of the display module 100 in a space between the first rear periphery region EA1 of the display module 100 and the first vibration generating module 300-1 and may be output in the forward direction of the display module 100. For example, the first vibration generating module 300-1 may realize a left sound (or a first sound) of the display apparatus, but embodiments are not limited thereto.

The second vibration generating module 300-2 may be disposed at a second rear periphery region EA2 of the display module 100. For example, the second vibration generating module 300-2 may be disposed at (or coupled to) a second rear periphery region EA2 of the second supporting member 150 which corresponds to (or overlaps) the second rear periphery region EA2 of the display module 100.

The second vibration generating module 300-2 may be configured to vibrate based on a sound signal to output a sound (or a sound wave) to a second rear periphery region EA2 (or a right periphery region) among the periphery region EA of the display module 100. A sound generated by the second vibration generating module 300-2 may be propagated (or transferred) to the second periphery region EA2 among the periphery region EA of the display module 100 to vibrate the second periphery region EA2 of the display module 100, and thus, may generate a sound S1 which is output to the forward portion of the display module 100. Also, at least a portion S2 of a sound having a high-pitched sound band among sounds generated by the second vibration generating module 300-2 may be reflected in the lateral direction of the display module 100 in a space between the second rear periphery region EA2 of the display module 100 and the second vibration generating module 300-2 and may be output in the forward direction of the display module 100. For example, the second vibration generating module 300-2 may realize a right sound (or a second sound) of the display apparatus, but embodiments are not limited thereto.

Each of the first and second vibration generating modules 300-1 and 300-2 may include a structure 310 and a vibration generator 330.

The structure 310 may be disposed at a rear surface of the display module 100 and may be configured to output a sound, output from the vibration generator 330, in the lateral direction of the display module 100.

The structure 310 according to an embodiment of the present disclosure may be referred to as a sound emission supporter, an acoustic emission supporter, a sound guide frame, a sound emission guide frame, or a sound supporting frame, but embodiments are not limited thereto.

The structure 310 may be disposed at the rear periphery region EA of the display module 100 and may support the vibration generator 330. For example, the structure 310 may be disposed at the rear periphery region EA of the second supporting member 150.

The structure 310 according to an embodiment of the present disclosure may be disposed at the rear periphery region EA of the display module 100. For example, the structure 310 may be supported by (or connected to) the rear periphery region EA of the display module 100 by the second connection member 400. For example, the structure 310 may be supported by (or connected to) a rear periphery region EA of the first portion 151 of the second supporting member 150 by the second connection member 400.

The second connection member 400 may be disposed between the first portion 151 of the second supporting member 150 and the structure 310. The second connection member 400 may dispose or couple the structure 310 to the first portion 151 of the second supporting member 150. The second connection member 400 may include a double-sided tape, a double-sided foam tape, a double-sided foam pad, or a double-sided foam pad tape, which includes an adhesive resin or an adhesive layer, but embodiments are not limited thereto. The adhesive resin or the adhesive layer of the second connection member 400 according to an embodiment of the present disclosure may include an acryl-based or a urethane-based adhesive material, but embodiments are not limited thereto. For example, the adhesive resin or the adhesive layer of the second connection member 400 may include the urethane-based adhesive material having a relatively ductile characteristic compared to the acryl-based adhesive material having a characteristic which is relatively high in hardness, for preventing or minimizing the transfer of a vibration of the display module 100 to the structure 310.

The second connection member 400 may be configured to include an opening portion or an open region, for solving a problem where a sound generated by the vibration generating device 300 is trapped between the second supporting member 150 and the structure 310 and thus is not output. For example, the second connection member 400 may include a side surface including an opening portion or an open region. For example, the second connection member 400 may have a structure where a side surface thereof is open. For example, a sound generated by the vibration generator 330 may pass through one side surface of the second connection member 400 and may be output in the lateral direction of the display module 100, and thus, a problem where a sound of a high-pitched sound band is not output may be solved, thereby enhancing a sound characteristic of the high-pitched sound band of a display apparatus. For example, the high-pitched sound band may be 3 kHz or more, but embodiments are not limited thereto and may be 5 kHz or more.

The structure 310 of the first vibration generating module 300-1 may be disposed on (or coupled to) the first rear periphery region EA1 of the second supporting member 150. The structure 310 of the second vibration generating module 300-2 may be disposed on (or coupled to) the second rear periphery region EA2 of the second supporting member 150. For example, the structure 310 of the first vibration generating module 300-1 may be a first structure or a first sound structure, and the structure 310 of the second vibration generating module 300-2 may be a second structure or a second sound structure.

The structure 310 may provide a first gap space GS1 between the rear surface of the display module 100 and the vibration generator 330. For example, the structure 310 may provide the first gap space GS1 between the rear periphery region EA of the second supporting member 150 and the vibration generator 330. The first gap space GS1 may be referred to as a sound generating space, a sound pressure space, a sound emission space, or an acoustic emission space, or a sound box, but embodiments are not limited thereto.

The structure 310 may support the vibration generator 330. A portion of a sound S2 generated by the vibration generator 330 may be repeatedly reflected (or diffracted) in the first gap space GS1 and may be output in the lateral direction of the display module 100. For example, the structure 310 may be disposed so that the vibration generator 330 is nonparallel to the rear surface of the display module 100 or a rear surface of the second supporting member 150. For example, the structure 310 may support the vibration generator 330 so that the vibration generator 330 is nonparallel to the rear surface of the display module 100 or the rear surface of the second supporting member 150. For example, the structure 310 may support the vibration generator 330 so that the vibration generator 330 is inclined from the rear surface of the display module 100.

The structure 310 according to an embodiment of the present disclosure may include a supporting portion 311, a sound guide portion 313, and a sound emission portion 315.

The supporting portion 311 may be disposed on the rear surface of the display module 100. For example, the supporting portion 311 may be disposed between the rear surface of the display module 100 and the vibration generator 330. The supporting portion 311 may be configured to support the vibration generator 330. The supporting portion 311 according to an embodiment of the present disclosure may include a supporting surface (or an inclined surface or an oblique surface) which is inclined to be nonparallel to the rear surface of the second supporting member 150, and thus, may support the vibration generator 330 so that the vibration generator 330 is inclined from the rear surface of the display module 100.

The supporting surface (or the inclined surface) of the supporting portion 311 may be sloped or inclined at an angle of 5 degrees or less with respect to the rear surface of the second supporting member 150. Accordingly, the supporting surface (or the inclined surface) of the supporting portion 311 may support the vibration generator 330 so that the vibration generator 330 is nonparallel to the rear surface of the display module 100 or the rear surface of the second supporting member 150.

The supporting portion 311 may include an opening portion which overlaps the vibration generator 330. For example, the opening portion of the supporting portion 311 may be configured to overlap a region, other than a periphery region, of the vibration generator 330.

The sound guide portion 313 may extend from the supporting portion 311 to one side or a side surface of the display module 100 along a first direction X. The sound guide portion 313 may extend from the supporting portion 311 along the first direction X and may be disposed in a rear peripheral region of the second supporting member 150. The sound guide portion 313 according to an embodiment of the present disclosure may guide a sound S2 generated based on a vibration of the vibration generator 330 supported by the supporting portion 311 so that the sound S2 travels in the lateral direction of the display module 100. According to an embodiment of the present disclosure, with respect to a thickness direction Z of the display module 100, a thickness of the sound guide portion 313 may be thickened progressively from the sound emission portion 315 to the supporting portion 311 along the first direction X.

The sound emission portion 315 may be provided at one end (or one portion) of the sound guide portion 313 in parallel with a second direction Y (or a lengthwise direction)

intersecting with the first direction X. The sound emission portion 315 may be configured to output the sound S2, traveling via the sound guide portion 313, in the forward direction of the display module 100.

The sound emission portion 315 according to an embodiment of the present disclosure may include a sound emission guider 315a and a sound emission port 315b.

The sound emission guider 315a may be configured to protrude from one side or an end of the sound guide portion 313 along the thickness direction Z of the display module 100. The sound emission guider 315a may include an inclined surface which reflects the sound S2, traveling via the sound guide portion 313, toward the sound emission port 315b. For example, the sound emission guider 315a may include a cross-sectional structure having a triangular shape, but embodiments are not limited thereto. A vertex of the sound emission guider 315a having a cross-sectional structure including a triangular shape may be spaced apart from one side or a side surface of the display module 100, for outputting the sound S2. For example, the sound emission guider 315a may be referred to as a protrusion portion, a triangular protrusion tip, or a sound emission tip, but embodiments are not limited thereto.

The sound emission port 315b may be disposed between the sound emission guider 315a and the display module 100 along the second direction Y. For example, the sound emission port 315b may include a slit or a slot shape, which extends along the second direction Y between the sound emission guider 315a and a side surface of the display module 100.

The vibration generator 330 of each of the first and second vibration generating modules 300-1 and 300-2 may be disposed in nonparallel with the rear surface of the display module 100. For example, the vibration generator 330 of each of the first and second vibration generating modules 300-1 and 300-2 may configured to be supported by (or coupled to) a corresponding structure 310.

The vibration generator 330 according to an embodiment of the present disclosure may be disposed on (or coupled to) the structure 310 in nonparallel with the rear region of the display module 100. For example, the vibration generator 330 may be disposed on (or coupled to) the structure 310 in nonparallel with the rear region of the second supporting member 150. For example, a distance between the rear region of the second supporting member 150 and the vibration generator 330 may increase progressively toward the one side or the side surface (or lateral surface) of the display module 100 along the first direction X.

The vibration generator 330 according to an embodiment of the present disclosure may be disposed on (or coupled to) the structure 310 and may vibrate based on a sound signal to output a sound pressure level or a sound to the display module 100. For example, the vibration generator 330 may vibrate based on a sound signal in a state which is sloped or inclined with respect to a rear region of the second supporting member 150, and thus, may generate a sound pressure level or may output a sound at the first gap space GS1 between the rear surface of the second supporting member 150 and the structure 310. Therefore, the sound output from the vibration generator 330 inclined with respect to the rear region of the second supporting member 150 may be repeatedly reflected (or diffracted) in the first gap space GS1 between the rear surface of the second supporting member 150 and the structure 310 and may travel in the lateral direction of the display module 100. Accordingly, the sound based on the sound pressure level output from the vibration generator 330 may be output in the forward direction and the lateral direction of the display module 100. For example, at least a portion of a sound of the high-pitched sound band among sounds generated by the vibration generator 330 may be repeatedly reflected (or diffracted) in the first gap space GS1 and may be output in the lateral direction of the display module 100 through one side surface of the second connection member 400 and the sound emission port 315b, thereby enhancing a sound characteristic of the high-pitched sound band of a display apparatus.

The vibration generator 330 may include a sound actuator or a sound exciter, but embodiments of the present disclosure are not limited thereto. For example, the vibration generator 330 may include a sound generator using a coil (or a voice coil) and a magnet.

The vibration generator 330 of each of the first and second vibration generating modules 300-1 and 300-2 according to an embodiment of the present disclosure may include a module frame 331, a bobbin 332, a magnet member 333, and a coil 334. Also, the vibration generator 330 of each of the first and second vibration generating modules 300-1 and 300-2 may further include a center pole 335 and a damper 336.

The module frame (or a base plate) 331 may be disposed at the rear surface of the display module 100. The module frame (or a base plate) 331 may be supported by the structure 310. For example, module frame 331 may be supported or coupled to the supporting portion 311 of the structure 310. The module frame 331 according to an embodiment of the present disclosure may include a first plate 331a, a second plate 331b, and a bracket 331c.

The first plate 331a may support the magnet member 333 and may be a lower plate. The first plate 331a may be referred to as a frame body, but embodiments of the present disclosure are not limited thereto.

The second plate 331b may have a cylindrical shape including a hollow portion and may be disposed to a periphery of a front surface the first plate 331a. The first plate 331a and the second plate 331b may be provided as one body having a U-shape. For example, the first plate 331a and the second plate 331b are not limited to these terms, and may be referred to as a yoke, etc.

The bracket (or fixing bracket) 331c may protrude from one side or a side surface of the second plate 331b. The bracket 331c may be supported or coupled to the supporting portion 311 of the structure 310 by a module connection member, and thus, the module frame 331 may be supported or coupled to the supporting portion 311 of the structure 310.

The module connection member according to an embodiment of the present disclosure may be a screw or a bolt, which may pass through the bracket 331c, and may be coupled to the supporting portion 311 of the structure 310. For example, an elastic member such as a buffering pad may be disposed between the supporting portion 311 of the structure 310 and the bracket 331c. The elastic member may prevent or minimize a vibration of the display module 100 from being transferred to the module frame 331.

The module connection member according to an embodiment of the present disclosure may support or couple a bracket 331c or a module frame 331 to the supporting portion 311 of the structure 310. For example, the module connection member may include an adhesive member disposed between the bracket 331c and the supporting portion 311 of the structure 310. For example, the adhesive member may include a double-sided tape, a double-sided foam tape, a double-sided foam pad, a double-sided foam pad tape, a double-sided adhesive pad, a double-sided adhesive gap pad, or a double-sided adhesive foam pad, but embodiments of the present disclosure are not limited thereto.

The bobbin 332 may be on the module frame 331 and may vibrate the display module 100. For example, the bobbin 332 may output a sound or generate a sound pressure level at the first gap space GS1 between the rear surface of the second supporting member 150 and the structure 310 and may vibrate the display module 100. For example, the bobbin 332 may vibrate the first portion 151 of the second supporting member 150.

The bobbin 332 according to an embodiment of the present disclosure may be disposed to be spaced apart from the rear surface of the display module 100. The bobbin 332 may include a cylindrical shape having a hollow portion 332a. For example, the bobbin 332 may have a ring-shaped structure, which may be formed of a material produced by processing pulp or paper, Al or Mg or an alloy thereof, synthetic resin such as polypropylene, or a polyamide-based fiber, but embodiments of the present disclosure are not limited thereto. The bobbin 332 may vibrate based on a magnetic force, and for example, may perform a vertical reciprocating motion, thereby outputting a sound at the first gap space GS1 or vibrating the second supporting member 150.

The bobbin 332 according to an embodiment of the present disclosure may have a circular shape or an elliptical (or oval shape), but embodiments of the present disclosure are not limited thereto. The bobbin 332 having the oval shape may have an elliptical shape, a corners-rounded rectangular shape, or a non-circular curved shape having a width different from its height, but embodiments of the present disclosure are not limited thereto. For example, in the bobbin 332 having the oval shape, a ratio of a long-axis diameter and a short-axis diameter may be 1.3:1 to 2:1. The bobbin 332 having the oval shape may more improve a sound of the high-pitched sound band than the circular shape and may reduce heat caused by a vibration, and thus, the bobbin 332 having the oval shape may have a good heat dissipation characteristic.

The magnet member 333 may be provided on the module frame 331 to be accommodated into the hollow portion 332a of the bobbin 332. The magnet member 333 may be a permanent magnet accommodated into the hollow portion 332a of the bobbin 332, but embodiments of the present disclosure are not limited thereto.

The coil 334 may be wound to surround an outer circumference surface of the bobbin 332 and may be supplied with a sound signal (or a voice signal) from the outside. The coil 334 may be raised or lowered along with the bobbin 332. When a sound signal (or a current) is applied to the coil 334, a whole portion of the bobbin 332 may vibrate, for example, may perform a vertical reciprocating motion along a third direction Z, according to Fleming's left hand rule based on an application magnetic field generated around the coil 334 and an external magnetic field generated around the magnet member 333. For example, the coil 334 may be referred to as a voice coil, but embodiments of the present disclosure are not limited thereto.

The center pole 335 may be on the magnet member 333, and may guide a vibration of the bobbin 332. For example, the center pole 335 may be inserted or accommodated into the hollow portion 332a of the bobbin 332, and may be surrounded by the bobbin 332. For example, the center pole 335 may be referred to as an elevation guider or pole pieces, but embodiments of the present disclosure are not limited thereto.

The damper 336 may be disposed between the module frame 331 and the bobbin 332. For example, the damper 336 according to an embodiment of the present disclosure may be disposed between the first plate 331a of the module frame 331 and an upper outer circumference surface of the bobbin 332. The damper 336 may be provided in a creased or wrinkled structure that may be creased between one end and the other end thereof and may be contracted and relaxed based on a vibration of the bobbin 332. A vibration distance (or a vertical movement distance) of the bobbin 332 may be limited by a restoring force of the damper 336. As one example, when the bobbin 332 vibrates by a certain distance or more or vibrates by a certain distance or less, the bobbin 332 may be restored to its original position by the restoring force of the damper 336. For example, the damper 336 may be referred to as a spider, a suspension, or an edge, but embodiments of the present disclosure are not limited thereto.

The vibration generator 330 according to an embodiment of the present disclosure may be referred to as an internal magnetic type (or a micro type) such that the magnet member 333 may be inserted or accommodated into the hollow portion 332a of the bobbin 332.

The vibration generator 330 according to another embodiment of the present disclosure may be referred to as an external magnetic type (or a dynamic type) such that the magnet member 333 is disposed to surround an outer portion of the bobbin 332. For example, except for that the magnet member 333 may be provided between the first plate 331a and the second plate 331b, and the center pole 335 may be provided on the first plate 331a to be inserted or accommodated into the hollow portion 332a of the bobbin 332, the external magnetic type vibration generator 330 may be substantially similar to the internal magnetic type. Thus, detailed descriptions are omitted.

The vibration generator 330 according to an embodiment of the present disclosure may further include a bobbin protection member 337.

The bobbin protection member 337 according to an embodiment of the present disclosure may be disposed between an upper portion of the bobbin 332 and the first portion 151 of the second supporting member 150. The bobbin protection member 337 may be disposed on the bobbin 332 to cover the hollow portion 332a of the bobbin 332, and thus, may protect the bobbin 332, thereby preventing deformation of the bobbin 332 caused by an external impact. The bobbin protection member 337 may be implemented to cover the hollow portion 332a of the bobbin 332, and thus, may increase a sound pressure level generated in the first gap space GS1 based on a vibration of the bobbin 332.

The bobbin protection member 337 according to an embodiment of the present disclosure may be provided in a molding form of an injection material or a molding product of metal. For example, the bobbin protection member 337 may include a textile reinforced material, a composite resin including a textile reinforced material, or metal, and for example, may have a heat dissipation function of dissipating heat occurring when the vibration generator 330 are being driven. The textile reinforced material may be one or more of carbon fiber reinforced plastics (CFRP), glass fiber reinforced plastics (GFRP), and graphite fiber reinforced plastics (GFRP), or a combination thereof, but embodiments of the present disclosure are not limited thereto.

As another example, a heat dissipation member may be further provided between the display module 100 and the structure 310. The heat dissipation member may include a metal material. For example, the heat dissipation member may include aluminum (Al), copper (Cu), silver (Ag), or an alloy thereof, but embodiments are not limited thereto. The heat dissipation member may be implemented as a metal plate, a heat dissipation sheet or a heat dissipation tape. The heat dissipation member may be disposed to have a size which is greater than or equal to that of the vibration generating device 300. As another example, the heat dissipation member may be disposed to have a size which is greater than or equal to that of the second supporting member 150.

The vibration generator 330 according to an embodiment of the present disclosure, as illustrated in FIGS. 3 and 4, may be configured in a twin type structure. The twin type structure may be referred to as a 2-array (two-array) structure. The vibration generator 330 having the twin type structure may include two sub vibration portions 330a and 330b disposed on the module frame 331. The two sub vibration portions 330a and 330b may be referred to as two sub vibration generators. The vibration generator 330 including the two sub vibration portions 330a and 330b may be referred to as a twin type vibration device, but the terms are not limited thereto.

The vibration generator 330 according to an embodiment of the present disclosure, as illustrated in FIGS. 3 and 4, is not limited to the twin type structure and may be implemented in a single type structure or may be configured in a 2 or more-array structure. For example, the vibration generator 330 may be configured in a 4-array structure or a 6-array structure.

The vibration generator 330 of the first vibration generating module 300-1 may vibrate based on a sound signal to output a sound (or a sound wave) to the first rear periphery region EA1 of the display module 100, and thus, may vibrate the first rear periphery region EA1 of the display module 100 to output a sound S1 in a forward region of the display module 100. At least a portion of a sound of the high-pitched sound band among sounds output from the vibration generator 330 of the first vibration generating module 300-1 to the first rear periphery region EA1 of the display module 100 may be reflected (or diffracted) in a lateral direction of the display module 100 by the structure 310 of the first vibration generating module 300-1 and may be output in the lateral direction and the forward direction of the display module 100.

The vibration generator 330 of the second vibration generating module 300-2 may vibrate based on a sound signal to output a sound (or a sound wave) to the second rear periphery region EA2 of the display module 100, and thus, may vibrate the second rear periphery region EA2 of the display module 100 to output a sound S1 in the forward region of the display module 100. At least a portion of a sound of the high-pitched sound band among sounds output from the vibration generator 330 of the second vibration generating module 300-2 to the second rear periphery region EA2 of the display module 100 may be reflected (or diffracted) in the lateral direction of the display module 100 by the structure 310 of the second vibration generating module 300-2 and may be output in the lateral direction and the forward direction of the display module 100.

For example, when the vibration generator 330 of each of the first and second vibration generating modules 300-1 and 300-2 vibrates based on a sound signal, a sound (or a sound wave) generated based on a vibration of the vibration generator 330 may be output to the first gap space GS1, a sound generated based on a vibration of the backlight part 120 based on a sound of the first gap space GS1 may be output to a sound transfer space STS, a sound S1 generated based on a vibration of the periphery regions EA1 and EA2 of the display panel 110 based on a sound of the sound transfer space STS may be output to a forward region with respect to the display panel 110, and at least a portion of a sound of the high-pitched sound band among sounds output from the vibration generator 330 to the first gap space GS1 may be reflected (or diffracted) in the lateral direction of the display module 100 by the structure 310 and may be output in the lateral direction and the forward direction of the display module 100.

Therefore, according to the present disclosure, at least a portion of a sound of the high-pitched sound band among sounds generated by the vibration generators 330 of the first and second vibration generating modules 300-1 and 300-2 may be output in the lateral direction of the display module 100, and thus, a sound characteristic of the high-pitched sound band of a display apparatus may be enhanced. Also, according to an embodiment of the present disclosure, a reflection region (or a reflection space) of a sound generated between the display module 100 and the first and second vibration generating modules 300-1 and 300-2 by the inclined vibration generator 330 may increase and a sound of the high-pitched sound band reflected (or diffracted) in the reflection region may increase, and thus, a reflection characteristic (or a diffraction characteristic) of a sound of the high-pitched sound band output in the lateral direction of the display module 100 may be enhanced. Accordingly, an output characteristic of a sound output in the lateral direction of the display module 100 may be enhanced, and thus, a sound characteristic of the high-pitched sound band of a display apparatus may be more enhanced.

Therefore, the display apparatus according to an embodiment of the present disclosure may output a sound S1 generated based on a vibration of the display module 100 by a sound output from the vibration generator 330 of the vibration generating device 300 disposed in the rear periphery region EA of the display module 100, and at least a portion of a sound of the high-pitched sound band among sounds output from the vibration generator 330 of the vibration generating device 300 may be guided in the lateral direction of the display module 100 by the structure 310 of the vibration generating device 300 and may be output in the lateral direction and the forward direction of the display module 100. Accordingly, in the display apparatus according to an embodiment of the present disclosure, a sound characteristic of the high-pitched sound band may be enhanced by a sound S2 output in the lateral direction of the display module 100.

Moreover, in the display apparatus according to an embodiment of the present disclosure, the vibration generator 330 of the vibration generating device 300 may be disposed to be inclined or to be nonparallel to the rear surface of the display module 100, and thus, a reflection region of a sound S2 reflected (or diffracted) between the display module 100 and the vibration generating device 300 may increase and a sound of the high-pitched sound band reflected (or diffracted) in the reflection region may increase, thereby enhancing a reflection characteristic (or a diffraction characteristic) of a sound of the high-pitched sound band output in the lateral direction of the display module 100. Accordingly, an output characteristic of a sound output in the lateral direction of the display module 100 may be enhanced, and thus, a sound characteristic of the high-pitched sound band of a display apparatus may be more enhanced.

Figure 6:
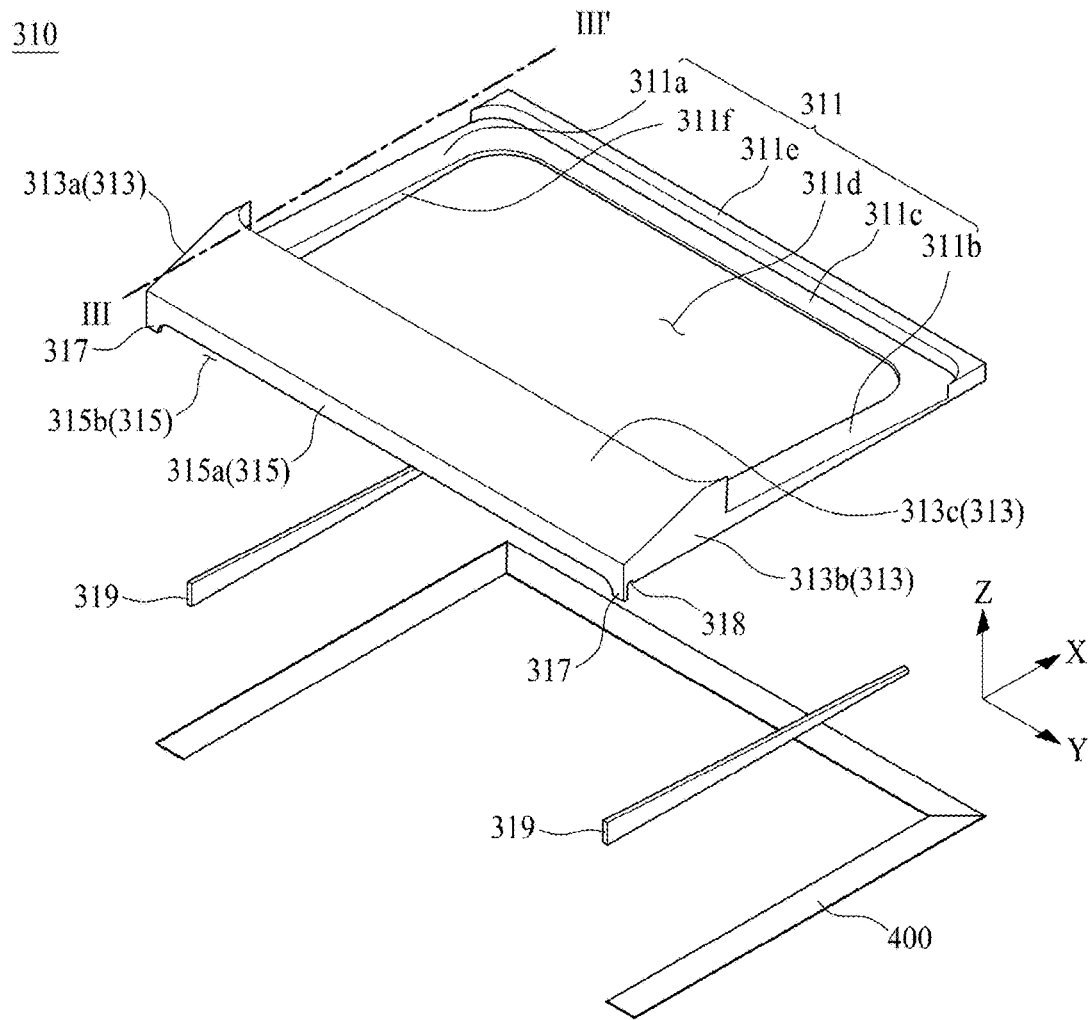
FIG. 6 illustrates a structure of a vibration generating module according to an embodiment of the present disclosure.
Figure 7:
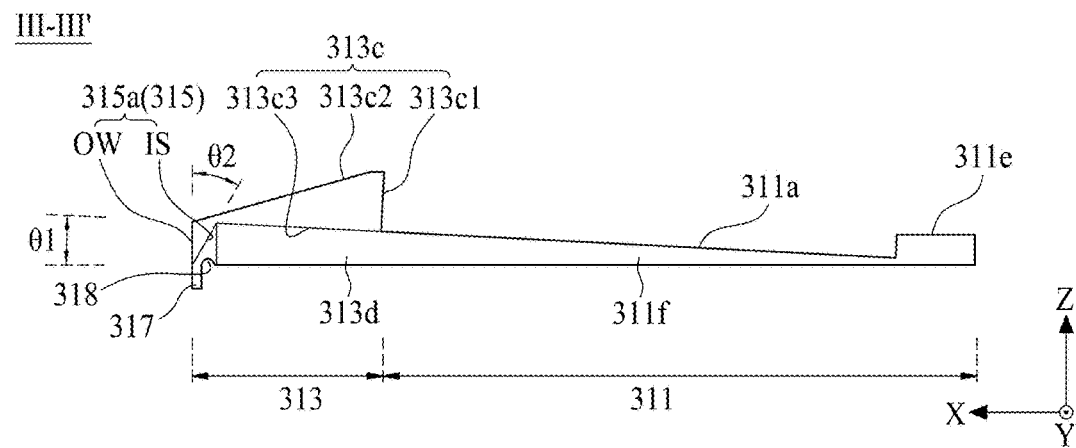
FIG. 7 is a cross-sectional view taken along line III-III' illustrated in FIG. 6.

FIG. 6 illustrates a structure of a vibration generating module according to an embodiment of the present disclosure, and FIG. 7 is a cross-sectional view taken along line III-III' illustrated in FIG. 6.

With reference to FIGS. 4 to 7, a structure 310 of a plurality of vibration generating modules 300-1 and 300-2 according to an embodiment of the present disclosure may include a supporting portion 311, a sound guide portion 313, and a sound emission portion 315.

The supporting portion 311 may be disposed at a rear region of the second supporting member 150. The supporting portion 311 may be supported by (or connected to) the rear region of the second supporting member 150.

The supporting portion 311 according to an embodiment of the present disclosure may include first to third supporting portions 311a to 311c and an opening portion 311d.

The first supporting portion 311a may be disposed along a first direction X and may be configured to support a first side (or one portion) of the vibration generator 330. The second supporting portion 311b may be configured to be parallel to the first supporting portion 311a and to support a second side (or other portion) of the vibration generator 330.

Each of the first and second supporting portions 311a and 311b according to an embodiment of the present disclosure may have a first length parallel to the first direction X, a second length parallel to a second direction Y, and a thickness parallel to a third direction Z. A thickness of each of the first and second supporting portions 311a and 311b may be thickened and increase progressively toward one side or a side surface of the display module 100 along the first direction X.

Each of the first and second supporting portions 311a and 311b according to an embodiment of the present disclosure may include a first surface and a second surface. The first surface may be adjacent to the rear region of the display module 100. The second surface may support the vibration generator 330 and may be nonparallel to the rear region of the display module 100. The second surface may support the vibration generator 330.

The first surface of each of the first and second supporting portions 311a and 311b may be parallel to the rear surface of the display module 100.

The second surface of each of the first and second supporting portions 311a and 311b may be opposite to the first surface and may be inclined or sloped from the rear region of the display module 100. The second surface of each of the first and second supporting portions 311a and 311b may be a top surface, an upper surface, a supporting surface, or an inclined surface, but embodiments are not limited thereto.

The second surface of each of the first and second supporting portions 311a and 311b may be inclined or sloped at an angle θ1 of 5 degrees or less with respect to the rear surface of the display module 100. Therefore, the second surface of each of the first and second supporting portions 311a and 311b may be disposed so that the vibration generator 330 is nonparallel to the rear surface of the display module 100 or the rear surface of the second supporting member 150. For example, in each of the first and second supporting portions 311a and 311b, an angle θ1 between the first surface and the second surface may be about 1 degree to about 5 degrees, but embodiments are not limited thereto.

In each of the first and second supporting portions 311a and 311b, a thickness between the first surface and the second surface may be thickened or increase progressively toward the one side or the side surface of the display module 100 along the first direction X. For example, in each of the first and second supporting portions 311a and 311b, a distance between the first surface and the second surface may increase progressively from the third supporting portion 311c to the sound guide portion 313 along the first direction X.

The third supporting portion 311c may be disposed along the second direction Y and may be disposed between one side of the first supporting portion 311a and one side of the second supporting portion 311b. The third supporting portion 311c may be configured to support a third side of the vibration generator 330.

The third supporting portion 311c according to an embodiment of the present disclosure may have a first length parallel to the first direction X, a second length parallel to the second direction Y, and a thickness parallel to the third direction Z. A thickness of the third supporting portion 311c may be thickened and increase progressively toward one side or a side surface of the display module 100 along the first direction X.

The third supporting portion 311c may include a first surface adjacent to the rear region of the display module 100 and a second surface nonparallel to the rear region of the display module 100. The second surface may support a third side of the vibration generator 330. For example, in the third supporting portion 311c, a distance between the first surface and the second surface may increase progressively from the third supporting portion 311c to the sound guide portion 313 along the first direction X.

A connection portion between the first supporting portion 311a and the third supporting portion 311c may have a curved shape. A connection portion between the second supporting portion 311b and the third supporting portion 311c may have a curved shape. The first surface of each of the first to third supporting portions 311a to 311c may be disposed at the rear surface of the display module 100 or the rear surface of the second supporting member 150. The first surface of each of the first to third supporting portions 311a to 311c may be supported by (or connected to) the rear surface of the display module 100 or the rear surface of the second supporting member 150 by the second connection member 400. The second surface of each of the first to third supporting portions 311a to 311c may be disposed at a rear periphery of each of first to third sides of the vibration generator 330. The second surface of each of the first to third supporting portions 311a to 311c may support a rear periphery portion of the first to third sides of the vibration generator 330. Accordingly, the vibration generator 330 may be nonparallel to the rear surface of the display module 100 or the rear surface of the second supporting member 150.

The opening portion 311d may overlap the vibration generator 330 and may be surrounded by the first to third supporting portions 311a to 311c. The opening portion 311d may overlap a portion, other than a rear periphery portion, of each of the first to third sides of the vibration generator 330. For example, the opening portion 311d may provide the first gap space GS1 between the inclined vibration generator 330 and the rear surface of the display module 100 (or the rear surface of the second supporting member 150).

The supporting portion 311 according to an embodiment of the present disclosure may further include a first stopper 311e disposed at the third supporting portion 311c.

The first stopper 311e may be disposed at the third supporting portion 311c and may be configured to define a disposition region of the vibration generator 330 supported by the first to third supporting portions 311a to 311c. The first stopper 311e according to an embodiment of the present disclosure may be configured to protrude vertically from a periphery portion of the third supporting portion 311c. The first stopper 311e may surround a side surface of the third side of the vibration generator 330 which is supported to be inclined by the first to third supporting portions 311a to 311c, and thus, may prevent movement of the vibration generator 330. For example, both periphery portions of the first stopper 311e may include a curved portion corresponding to a curved corner portion of the vibration generator 330.

The vibration generator 330 supported by the supporting portion 311 may be inclined from the rear surface (or the rear surface of the second supporting member 150) of the display module 100, and thus, a distance between the vibration generator 330 and the rear surface of the display module 100 may increase progressively toward the one side or the side surface of the display module 100 along the first direction X, or may increase progressively from the third supporting portion 311c to the sound guide portion 313 along the first direction X.

The sound guide portion 313 may extend from the supporting portion 311 along the first direction X and may configured to be disposed at a rear peripheral region of the second supporting member 150.

The sound guide portion 313 may have a first length parallel to the first direction X, a second length parallel to the second direction Y, and a thickness parallel to the third direction Z.

According to an embodiment of the present disclosure, the first length of the sound guide portion 313 may have a length which is 3 mm or more and half or less of a length of vibration generator 330. In a case where the first length of the sound guide portion 313 is less than 3 mm, as a length of a reflection region (or a reflection space) of a sound traveling in the lateral direction of the display module 100 is reduced, a reflection characteristic of a sound of the high-pitched sound band may not be obtained.

According to an embodiment of the present disclosure, an uppermost surface of the sound guide portion 313 may be disposed on the same plane as an uppermost surface of the module frame 331 of the vibration generator 330. For example, the uppermost surface of the sound guide portion 313 may not protrude upward from the uppermost surface of the module frame 331 of the vibration generator 330 supported by the supporting portion 311 and may match the uppermost surface of the module frame 331 or may be disposed under the uppermost surface of the module frame 331.

According to an embodiment of the present disclosure, a thickness of the sound guide portion 313 may increase progressively from the sound emission portion 315 to the supporting portion 311 along the first direction X, for decreasing a thickness of periphery of a display apparatus. For example, when a thickness of the sound guide portion 313 is identical along the first direction X and the uppermost surface of the sound guide portion 313 matches the uppermost surface of the module frame 331, a periphery thickness of a display apparatus may increase due to a thickness of a periphery region of the display module 100. For example, a thickness of the sound guide portion 313 may be implemented to be thinned progressively toward the one side or the side surface of the display module 100 along the first direction X, and thus, a thickness of the first supporting member 500 covering the periphery region EA of the display module 100 may be reduced. Therefore, a thickness of a periphery portion of the display apparatus overlapping the periphery region EA of the display module 100 may be reduced. For example, a rear periphery portion of the first supporting member 500 overlapping the sound guide portion 313 may be configured to include an inclined third portion 550 between the first portion 510 and the second portion 530. Accordingly, a thickness of a periphery portion of a display apparatus may be reduced.

The sound guide portion 313 according to an embodiment of the present disclosure may include a first extension portion 313a, a second extension portion 313b, and a cover portion 313c.

The first extension portion 313a may extend from the first supporting portion 311a of the supporting portion 311 along the first direction X. The second extension portion 313b may extend from the second supporting portion 311b of the supporting portion 311 in parallel with the first extension portion 313a. For example, each of the first and second extension portions 313a and 313b may extend from one side or an end of the supporting portion 311 to have a length which is 3 mm or more and half or less of a length of the vibration generator 330, along the first direction X.

Each of the first and second extension portions 313a and 313b may include a first surface adjacent to the rear region of the display module 100 and a second surface which supports the cover portion 313c and is nonparallel to the rear region of the display module 100.

The first surface of each of the first and second extension portions 313a and 313b may be parallel to the rear surface of the display module 100. The second surface of each of the first and second extension portions 313a and 313b may be opposite to the first surface and may be inclined or sloped in nonparallel with the rear surface of the display module 100. In each of the first and second extension portions 313a and 313b, a thickness between the first surface and the second surface may increase progressively toward the one side or the side surface of the display module 100 along the first direction X.

The cover portion 313c may be disposed on the first extension portion 313a and the second extension portion 313b and may cover a space between the first extension portion 313a and the second extension portion 313b. A space, which is covered by the cover portion 313c and is provided between the first extension portion 313a and the second extension portion 313b on the rear surface of the display module 100 (or the rear surface of the second supporting member 150), may be a second gap space GS2 connected to (or communicating with) the first gap space GS1 between the rear surface of the display module 100 and the vibration generator 330. A sound output from the vibration generator 330 to the first gap space GS1 may be reflected (or diffracted) once or more in each of the first gap space GS1 and the second gap space GS2 and may travel (or propagate) toward the sound emission portion 315.

The cover portion 313c according to an embodiment of the present disclosure may have a first length parallel to the first direction X, a second length parallel to the second direction Y, and a thickness parallel to the third direction Z.

The first length of the cover portion 313c may have a length which is 3 mm or more and half or less of a length of vibration generator 330. A thickness of the cover portion 313c may be implemented to be reduced progressively toward the one side or the side surface of the display module 100 along the first direction X, and thus, a thickness of a periphery portion of the first supporting member 500 covering the periphery region EA of the display module 100 may be reduced. Therefore, a thickness of a periphery portion of the display apparatus overlapping the periphery region EA of the display module 100 may be reduced. For example, a rear periphery portion of the first supporting member 500 overlapping the cover portion 313c may be configured to include an inclined third portion 550 between the first portion 510 and the second portion 530. Accordingly, a thickness of a periphery portion of a display apparatus may be reduced.

The cover portion 313c may include a second stopper 313c1, a first surface 313c2, and a second surface 313c3. The first surface 313c2 may be an outer inclined surface or an inclined surface. The second surface 313c3 may be a ceiling surface.

The second stopper 313c1 may be disposed on the first and second extension portions 313a and 313b along the second direction Y and may be configured to define a disposition region of the vibration generator 330 supported by the supporting portion 311. For example, the disposition region of the vibration generator 330 may be defined by the first stopper 311e of the supporting portion 311 and the second stopper 313c1 of the sound guide portion 313.

The second stopper 313c1 according to an embodiment of the present disclosure may surround a side surface of a fourth side of the vibration generator 330 which is supported to be inclined by the supporting portion 311, thereby preventing movement of the vibration generator 330. For example, both periphery portions of the second stopper 313c1 may include a curved portion corresponding to the curved corner portion of the vibration generator 330.

The first surface 313c2 may be configured to be inclined or sloped from an uppermost surface of the second stopper 313c1 to the second surface of each of the first and second extension portions 313a and 313b. For example, a distance between the first surface 313c2 and the rear surface of the display module 100 (or the rear surface of the second supporting member 150) may be reduced progressively toward the one side or the side surface of the display module 100 in the first direction X. For example, an angle between the first surface 313c2 and the rear surface of the display module 100 (or the rear surface of the second supporting member 150) may be 45 degrees or less. When the angle between the first surface 313c2 and the rear surface of the display module 100 (or the rear surface of the second supporting member 150) is greater than 45 degrees, a thickness of a periphery region of a display apparatus may increase due to an increase in thickness of the cover portion 313c.

The second surface 313c3 may be a lower surface of the cover portion 313c and may be spaced apart from the rear surface of the display module 100 (or the rear surface of the second supporting member 150). The second surface 313c3 may provide the second gap space GS2 between the rear surface of the display module 100 (or the rear surface of the second supporting member 150) and the cover portion 313c.

According to an embodiment of the present disclosure, the second surface 313c3 may be configured to be parallel to the rear surface of the display module 100 (or the rear surface of the second supporting member 150) or to be nonparallel to the rear surface of the display module 100 (or the rear surface of the second supporting member 150). For example, an angle between the second surface 313c3 and the rear surface of the display module 100 (or the rear surface of the second supporting member 150) may be about 1 degree to about 5 degrees. For example, the angle between the second surface 313c3 and the rear surface of the display module 100 (or the rear surface of the second supporting member 150) may be the same as an angle between the rear surface of the display module 100 (or the rear surface of the second supporting member 150) and the vibration generator 330.

The sound emission portion 315 may be configured to protrude from one side (for example, an end) of the sound guide portion 313 along the third direction Z. The sound emission portion 315 may be configured to output a sound S2, which is reflected (or diffracted) in the first gap space GS1 and the second gap space GS2 and travels in the lateral direction of the display module 100, in the forward direction of the display module 100. For example, the sound emission portion 315 may be configured to reflect a sound S2, which travels via the first and second gap spaces GS1 and GS2, in the forward direction of the display module 100. For example, the sound emission portion 315 may include a reflection surface or an inclined surface, which reflects the sound S2, which travels via the first and second gap spaces GS1 and GS2, in the forward direction of the display module 100.

The sound emission portion 315 may protrude from the one side (for example, the end) of the sound guide portion 313 to the rear surface of the display module 100 along the third direction Z and in parallel with the second direction Y, and thus, may cover a space between the rear surface of the display module 100 and the one side or the end of the sound guide portion 313. A sound S2 traveling via the first and second gap spaces GS1 and GS2 may be output in the forward direction of the display module 100 through a space between the rear surface of the display module 100 and the sound emission portion 315.

The sound emission portion 315 according to an embodiment of the present disclosure may include a sound emission guider 315a and a sound emission port 315b.

The sound emission guider 315a may protrude from the one side or the end of the sound guide portion 313 to the rear surface of the display module 100 along the third direction Z and in parallel with the second direction Y. For example, the sound emission guider 315a may protrude from the ceiling surface 313c3 of the cover portion 313c of the sound guide portion 313 overlapping the one side or the side surface of the display module 100. The sound emission guider 315a may be configured to cover a portion of a space between the rear surface of the display module 100 and the one side or the end of the sound guide portion 313. The sound emission guider 315a may be spaced apart from the one side or the side surface of the display module 100.

The sound emission guider 315a according to an embodiment of the present disclosure may include a first surface OW, which is exposed at the outside of the one side or the side surface of the display module 100, and a second surface IS which is inclined from one side or an end of the first surface OW adjacent to the display module 100. The first surface OW may be parallel to the third direction Z. For example, the sound emission guider 315a may include a triangular cross-sectional structure where the second surface IS is a sloped surface. According to an embodiment of the present disclosure, an angle θ2 between the first surface OW and the second surface IS of the sound emission guider 315a may be adjusted to a range of 45 degrees to 75 degrees so that a sound S2 traveling via the sound guide portion 313 is smoothly output in the forward direction of the display module 100 through the sound emission port 315b. For example, the angle θ2 between the first surface OW and the second surface IS of the sound emission guider 315a may be adjusted to a range of 55 degrees to 65 degrees. For example, the sound emission guider 315a may include a protrusion portion having an angle between 45 degrees and 75 degrees. The protrusion portion may include a triangular protrusion portion (or a triangular protrusion tip or a sound emission tip).

According to an embodiment of the present disclosure, with respect to the first direction X, a distance D1 between the first surface OW of the sound emission guide 315a and the one side or the side surface of the display module 100 may be 1±0.5 mm so that the sound S2 traveling via the sound guide portion 313 is smoothly output in the forward direction of the display module 100 through the sound emission port 315b. For example, with respect to the first direction X, a distance D1 between the first surface OW of the sound emission guide 315a and the one side or the side surface of the panel guide 130 may be 1±0.5 mm.

According to an embodiment of the present disclosure, with respect to the third direction Z, a shortest distance between the first surface OW of the sound emission guide 315a and the display module 100 may be ±0.5 mm so that the sound S2 traveling via the sound guide portion 313 is smoothly output in the forward direction of the display module 100 through the sound emission port 315b. For example, with respect to the third direction Z, a shortest distance between the first surface OW of the sound emission guide 315a and the one side or the side surface of the panel guide 130 may be ±0.5 mm.

The sound emission port 315b may be provided between the sound emission guider 315a and the display module 100 along the second direction Y. For example, the sound emission port 315b may be a separation space between the sound emission guider 315a and the display module 100. For example, the sound emission port 315b may include a slit or a slot shape, which extends along the second direction Y between the sound emission guider 315a and the display module 100.

The structure 310 of the vibration generating modules 300-1 and 300-2 according to an embodiment of the present disclosure may further include a protrusion portion 317 and a concave portion 318. The protrusion portion 317 may include a pair of protrusion portions. The protrusion portion 317 may be a corner projection or bump.

The pair of protrusion portions 317 may protrude from both corner portions of the sound guide portion 313 along the third direction Z. For example, the protrusion portion 317 may protrude from a corner portion of each of both ends of the sound guide portion 313 along the third direction Z. With respect to the third direction Z, a length of the pair of protrusion portions 317 may be longer than that of the sound emission guider 315a. The pair of protrusion portions 317 may surround a portion of the side surface of the display module 100. For example, an inner surface of each of the pair of protrusion portions 317 may contact or be spaced apart from the side surface of the display module 100. For example, the inner surface of each of the pair of protrusion portions 317 may contact or be spaced apart from one side or a side surface of the panel guide 130. The pair of protrusion portions 317 may prevent a sound S2, output through the sound emission port 315b, from being output in the second direction Y. The pair of protrusion portions 317 may define a length of the sound emission port 315b with respect to the second direction Y.

The concave portion 318 may be configured to be concave between each of the pair of protrusion portions 317 and each of the first extension portion 313a and the second extension portion 313b of the sound guide portion 313. The concave portion 318 may accommodate the guide side portion 133 of the panel guide 130, and thus, may prevent a physical contact between the structure 310 and the panel guide 130 moving in the third direction Z. Accordingly, the structure 310 may be prevented from being lifted by the movement of the panel guide 130.

The structure 310 of the vibration generating modules 300-1 and 300-2 according to an embodiment of the present disclosure may further include a sound reflection prevention member 319.

The sound reflection prevention member 319 may be disposed at a third surface 311f of the supporting portion 311 and a third surface 313d of the sound guide portion 313, and the supporting portion 311 and the sound guide portion 313 being parallel to the first direction X. Each of the third surfaces 311f and 313d may be an inner surface. For example, the sound reflection prevention member 319 may be disposed on the inner surfaces 311f and 313d of each of the supporting portion 311 and the sound guide portion 313. The sound reflection prevention member 319 may prevent sounds, generated in the first and second gap spaces GS1 and GS2, from being reflected by the third surface 311f of the supporting portion 311 and the third surface 313d of the sound guide portion 313, thereby improving a deep phenomenon of a sound. For example, the sound reflection prevention member 319 may be a sound absorption member. For example, the sound reflection prevention member 319 may be a pad, a tape, a foam tape, a foam pad, or a sponge.

According to an embodiment of the present disclosure, the sound reflection prevention member 319 may be configured to cover one or more or all of the third surface 311f of each of the first and second supporting portions 311a and 311b of the supporting portion 311 and the third surface 313d of each of the first and second extension portions 313a and 313b of the sound guide portion 313. For example, the sound reflection prevention member 319 may be configured in a shape corresponding to the third surface 311f of the first supporting portion 311a and the third surface 313d of the first extension portion 313a. The sound reflection prevention member 319 may be attached on one or more or all of the third surface 311f of the first supporting portion 311a and the third surface 313d of the first extension portion 313a. Also, the sound reflection prevention member 319 may be configured in a shape corresponding to the third surface 311f of the second supporting portion 311b and the third surface 313d of the second extension portion 313b. The sound reflection prevention member 319 may be attached on one or more or all of the third surface 311f of the second supporting portion 311b and the third surface 313d of the second extension portion 313b.

Figure 8:
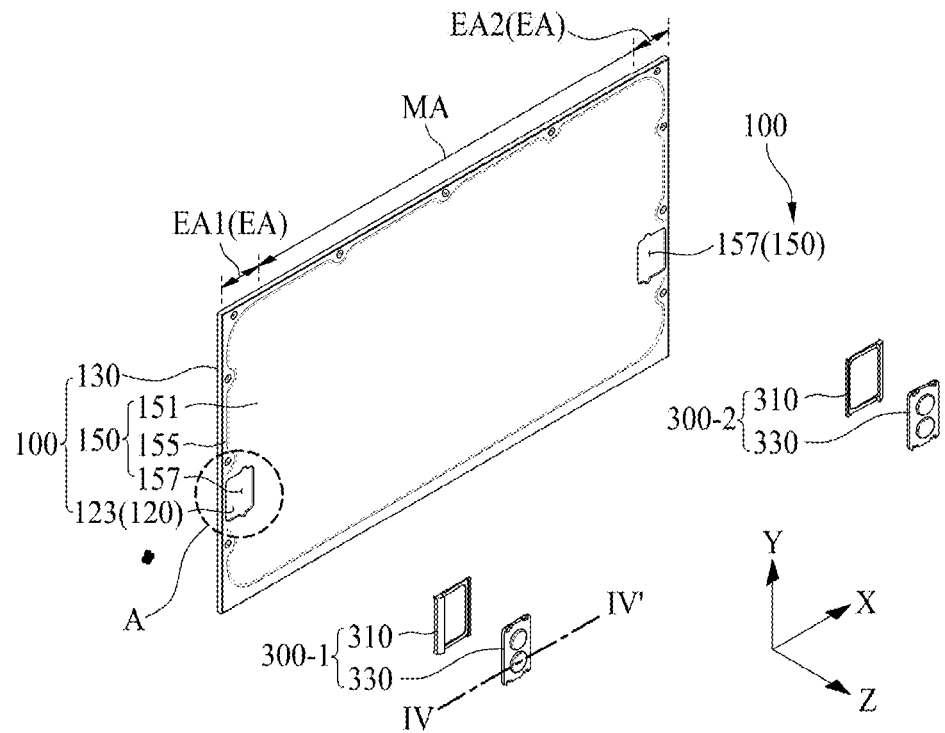
FIG. 8 illustrates a display apparatus according to another embodiment of the present disclosure.
Figure 9:
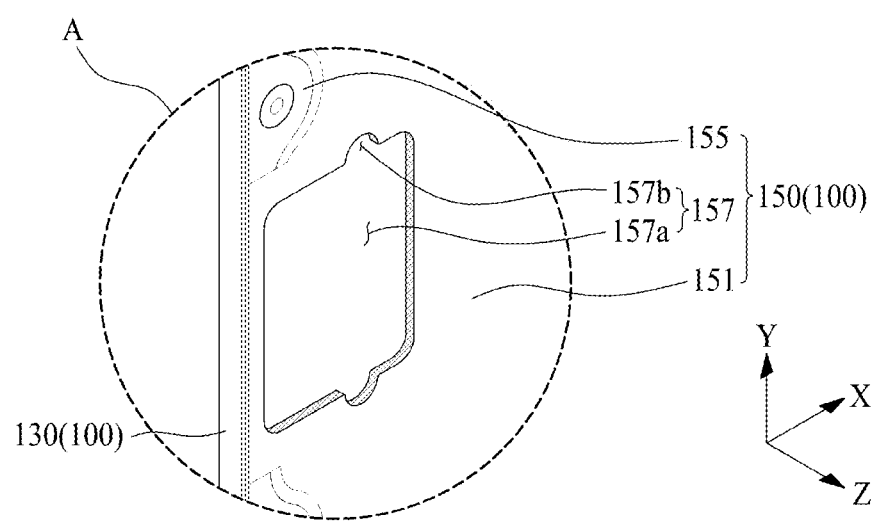
FIG. 9 is an enlarged view of a region A illustrated in FIG. 8.
Figure 10:
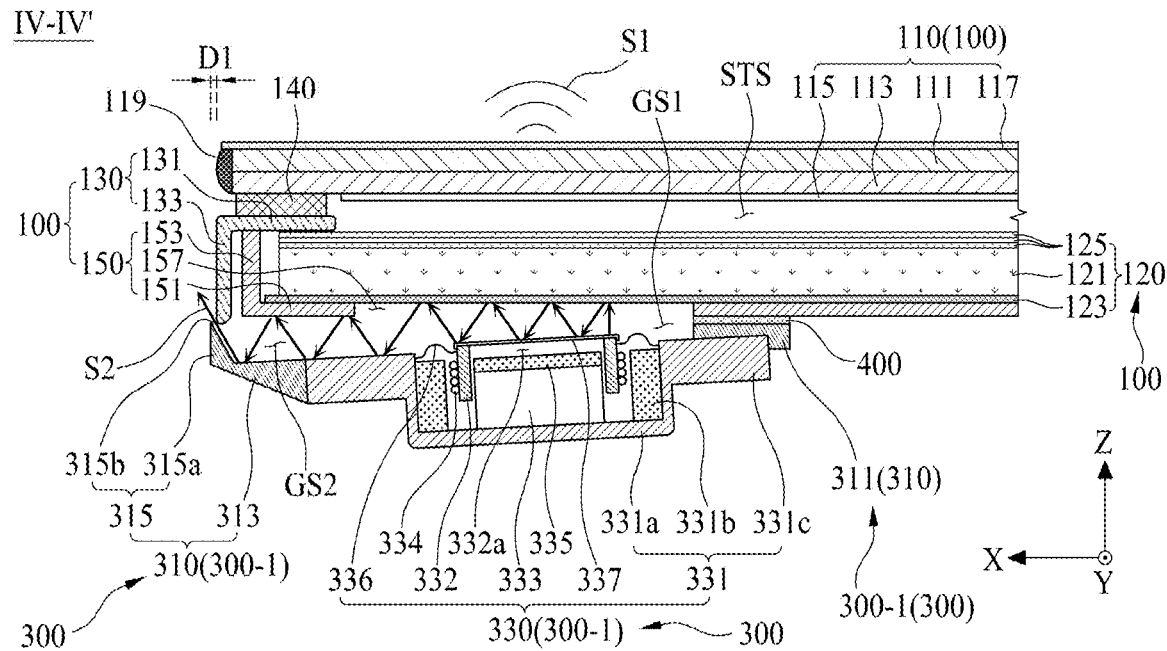
FIG. 10 is a cross-sectional view taken along line IV-IV' illustrated in FIG. 8.

FIG. 8 illustrates a display apparatus according to another embodiment of the present disclosure, FIG. 9 is an enlarged view of a region A illustrated in FIG. 8, and FIG. 10 is a cross-sectional view taken along line IV-IV' illustrated in FIG. 8. The drawings illustrate an embodiment where a structure of a second supporting member is modified in the display apparatus illustrated in FIGS. 1 to 7. In the following description, therefore, a second supporting member will be described in detail, the other elements are referred to by the same reference numerals as FIGS. 3 to 7, and their repetitive descriptions are omitted or will be briefly given.

With reference to FIGS. 8 to 10, in the display apparatus according to another embodiment of the present disclosure, a second supporting member 150 may further include at least one hole 157 which overlaps a vibration generating device 300. For example, the second supporting member 150 may include a material including ferrous metal described above.

The hole 157 may be provided at a first portion 151 to overlap the vibration generating device 300.

The hole 157 according to an embodiment of the present disclosure may be provided at the first portion 151 to overlap a magnetic field region of the vibration generating device 300. The second supporting member 150 may support a portion, other than the magnetic field region, of the vibration generating device 300. The hole 157 may overlap a magnetic field region of each of first and second vibration generating modules 300-1 and 300-2 of the vibration generating device 300. For example, the hole 157 may be implemented to have a size which is greater than that of the magnetic field region of each of the first and second vibration generating modules 300-1 and 300-2. Accordingly, a phenomenon where a magnetic field generated in the vibration generating device 300 is distorted by the first portion 151 of the second supporting member 150 may be prevented or minimized, thereby enhancing a sound output characteristic of the vibration generating device 300 (for example, a sound output characteristic of each of the first and second vibration generating modules 300-1 and 300-2.

The hole 157 according to an embodiment of the present disclosure may be provided at the first portion 151 to overlap each of the first and second vibration generating modules 300-1 and 300-2 of the vibration generating device 300. For example, the hole 157 may overlap a vibration generator 330 which is provided at each of the first and second vibration generating modules 300-1 and 300-2. For example, the hole 157 may overlap a bobbin 332 or a magnet member 333 of the vibration generator 330.

The hole 157 according to an embodiment of the present disclosure may have a size which is greater than that of the bobbin 332 or the magnet member 333 of the vibration generator 330. For example, the hole 157 may have a polygonal shape, a circular shape, or an oval shape, which has a greater size than that of the bobbin 332 or the magnet member 333 of the vibration generator 330, but embodiments are not limited thereto. For example, the hole 157 may be formed by a patterning process or a punching process performed on the second supporting member 150, but embodiments are not limited thereto. For example, the hole 157 may be referred to as a first hole, a cover hole, a pattern hole, a hole pattern, a through hole, or a ceiling hole, but embodiments are not limited thereto.

According to an embodiment of the present disclosure, the hole 157 may include a tetragonal shape where a corner portion is rounded in a curved shape. According to an embodiment of the present disclosure, the hole 157 may include a main hole 157a and a sub-hole 157b. The main hole 157a may include a corner portion which is rounded in a curved shape. The sub-hole 157b may be connected to (or communicate with) each of a first side and a second side of the main hole 157a along a second direction Y. For example, the sub-hole 157b may have a semicircular shape or a semi-oval shape, which has a relatively less size than that of the main hole 157a.

A sound output from each of the first and second vibration generating modules 300-1 and 300-2 of the vibration generating device 300 may be output in a forward direction of the display module 100 through the hole 157. At least a portion S2 of a sound of the high-pitched sound band among sounds output from each of the first and second vibration generating modules 300-1 and 300-2 may be output in a lateral direction of the display module 100.

Therefore, in the display apparatus according to another embodiment of the present disclosure, at least a portion of a sound of the high-pitched sound band among sounds generated based on a vibration of the vibration generating device 300 may be guided in the lateral direction of the display module 100 by a structure 310 of the vibration generating device 300 and may be output in the lateral direction and the forward direction of the display module 100, and thus, a sound characteristic of the high-pitched sound band may be enhanced by a sound S2 output in the lateral direction of the display module 100. Also, because the display apparatus according to another embodiment of the present disclosure includes the second supporting member 150 including the hole 157 overlapping the magnetic field region of the vibration generating device 300, the distortion of a magnetic field of the vibration generating device 300 caused by the second supporting member 150 may be prevented or minimized, and thus, a sound output characteristic of the vibration generating device 300 may be enhanced. Accordingly, a sound output characteristic based on a vibration of the vibration generating device 300 may be enhanced.

Figure 11:
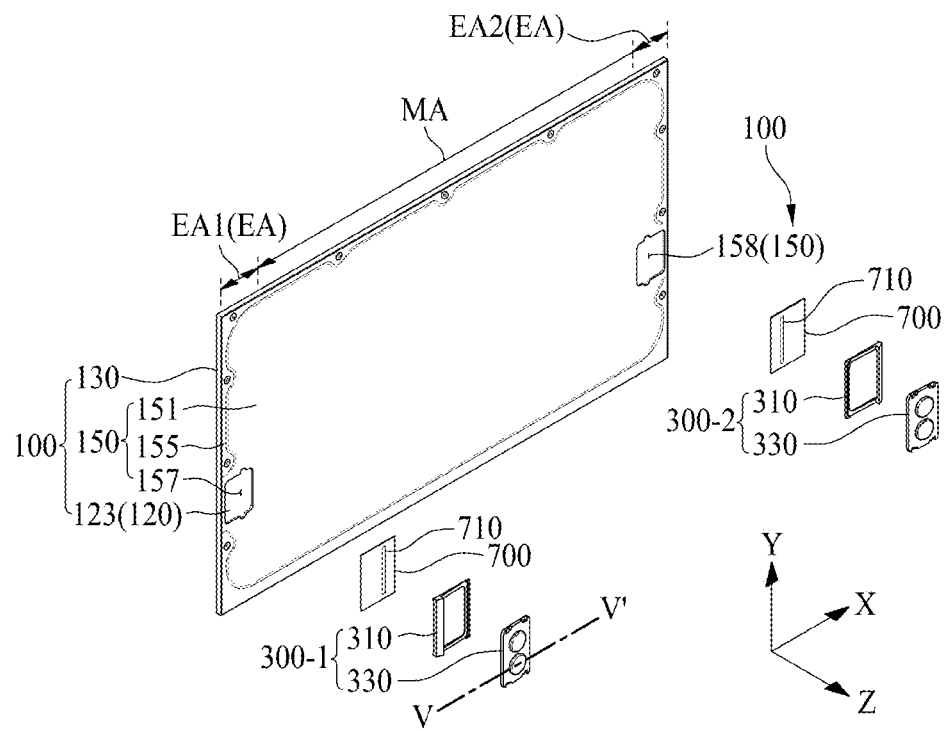
FIG. 11 illustrates a display apparatus according to another embodiment of the present disclosure.
Figure 12:
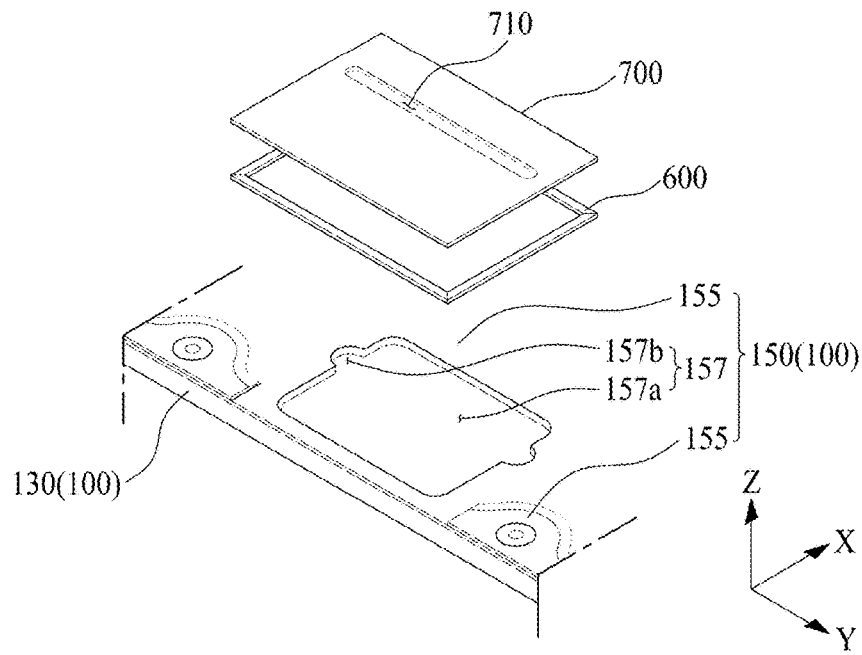
FIG. 12 illustrates a hole and a plate illustrated in FIG. 11.
Figure 13:
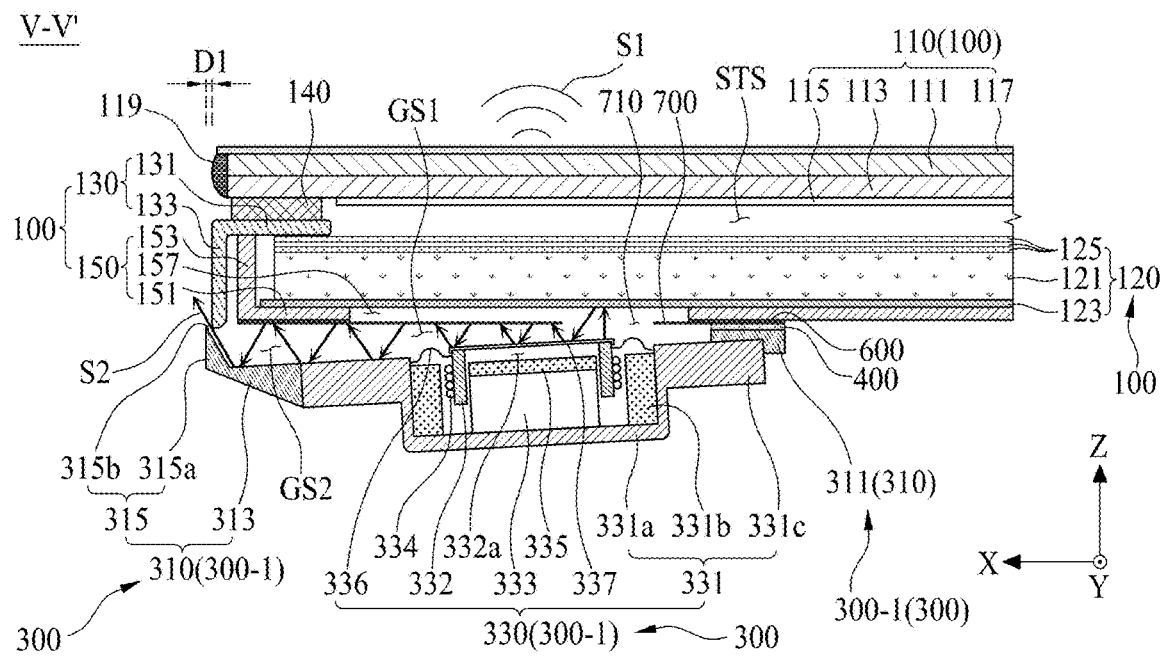
FIG. 13 is a cross-sectional view taken along line V-V' illustrated in FIG. 11.

FIG. 11 illustrates a display apparatus according to another embodiment of the present disclosure, FIG. 12 illustrates a hole and a plate illustrated in FIG. 11, and FIG. 13 is a cross-sectional view taken along line V-V' illustrated in FIG. 11. The drawings illustrate an embodiment where a plate is additionally provided in the display apparatus illustrated in FIGS. 8 to 10. In the following description, therefore, a plate will be described in detail, the other elements are referred to by the same reference numerals as FIGS. 3 to 10, and their repetitive descriptions are omitted or will be briefly given.

With reference to FIGS. 11 to 13, the display apparatus according to another embodiment of the present disclosure may further include a plate 700 disposed between a display module 100 and a vibration generating device 300.

The plate 700 may be disposed between each of first and second vibration generating modules 300-1 and 300-2 of the vibration generating device 300 and a rear surface of the display module 100. For example, the plate 700 may be disposed between a structure 310 of each of first and second vibration generating modules 300-1 and 300-2 and the rear surface of the display module 100. For example, the plate 700 may be disposed between a second supporting member 150 and the vibration generating device 300. For example, the plate 700 may be disposed between the structure 310 of each of first and second vibration generating modules 300-1 and 300-2 and a first portion 151 of the second supporting member 150. The plate 700 may support the structure 310 of each of first and second vibration generating modules 300-1 and 300-2.

The plate 700 according to an embodiment of the present disclosure may be connected or coupled to the first portion 151 of the second supporting member 150 overlapping the vibration generating device 300 and may support the vibration generating device 300. For example, the plate 700 may be connected or coupled to the first portion 151 of the second supporting member 150 to cover a hole 157 of the second supporting member 150.

The plate 700 according to an embodiment of the present disclosure may be configured to have a size which is greater than that of the hole 157 of the second supporting member 150. For example, the plate 700 may be configured to have a size which is greater than or equal to that of each of the first and second vibration generating modules 300-1 and 300-2 of the vibration generating device 300.

The plate 700 may include a material which differs from that of the second supporting member 150. The plate 700 according to an embodiment of the present disclosure may include nonferrous metal. For example, when the plate 700 includes a ferrous material, distortion of a magnetic field generated in the vibration generating device 300 may occur. To prevent or decrease the magnetic field distortion of the vibration generating device 300 caused by the plate 700, the plate 700 may include a nonferrous material. For example, the plate 700 may include a material other than a nonferrous material included in the magnet member 333 of the vibration generator 330. For example, the plate 700 may include one or more of Al, a Mg, a Mg alloy, a Mg—Li alloy, and an Al alloy, but embodiments are not limited thereto and may include a material which does not include Fe. Accordingly, a phenomenon where a magnetic field generated in the vibration generating device 300 is distorted by the second supporting member 150 or the plate 700 may be prevented or minimized, thereby enhancing a sound output characteristic of the vibration generating device 300 (for example, a sound output characteristic of each of the first and second vibration generating modules 300-1 and 300-2).

The plate 700 according to an embodiment of the present disclosure may further include a communication hole 710.

The communication hole 710 may overlap the hole 157 disposed in the second supporting member 150. The communication hole 710 may communicate the hole 157 disposed in the second supporting member 150 and the first gap space GS1. The communication hole 710 may be a sound transmission region where a sound (or a sound wave) output from the vibration generating device 300 is transferred (or propagated) to a rear surface of the display module 100.

The communication hole 710 according to an embodiment of the present disclosure may have a size which is relatively less than that of the hole 157 disposed in the second supporting member 150. The communication hole 710 according to an embodiment of the present disclosure may have a first length parallel to a first direction X and a second length which is parallel to a second direction Y and is longer than the first length. The communication hole 710 may be implemented to extend along the second direction Y.

The communication hole 710 according to an embodiment of the present disclosure may have a shape which differs from that of the hole 157 disposed in the second supporting member 150. The communication hole 710 may have a polygonal shape, a circular shape, or an oval shape, but embodiments are not limited thereto. For example, the communication hole 710 may have a slit shape (or a slot shape) which overlaps a main hole 157a of the hole 157 disposed in the second supporting member 150, and both periphery portions of the communication hole 710 overlapping a sub-hole 157b may include a round portion having a curved shape. According to an embodiment of the present disclosure, the communication hole 710 may be formed by a patterning process or a punching process performed on the plate 700, but embodiments are not limited thereto. For example, the communication hole 710 may be referred to as a second hole, a connection hole, an air hole, a pattern hole, a hole pattern, a through hole, or a punch hole, but embodiments are not limited thereto.

The plate 700 including the communication hole 710 according to an embodiment of the present disclosure may be a sound balance member. The plate 700 may be configured to maintain a balance between a forward sound (or a transmissive sound), traveling in the forward direction of the display module 100, and a lateral sound (or a reflection sound), traveling in the lateral direction of the display module 100, among sounds generated in the vibration generating device 300. For example, the plate 700 may be configured to maintain a balance between a sound transferred (or propagated) to the display module 100 and a sound reflected (or diffracted) in the first gap space GS1 while maintaining an output (or radiation) characteristic of the high-pitched sound band output in the lateral direction of the display module 100, based on a sound generated in the vibration generating device 300.

According to an embodiment of the present disclosure, to maintain a balance of the sound generated in the vibration generating device 300, the communication hole 710 may overlap only a portion of a magnetic field region formed in the vibration generating device 300. The communication hole 710 may overlap half or less of the magnetic field region formed in the vibration generating device 300. The communication hole 710 may overlap a portion of a bobbin 332 or a magnet member 333 of a vibration generator 330 provided in each of the first and second vibration generating modules 300-1 and 300-2 of the vibration generating device 300. The communication hole 710 may be implemented to have a size which is less than that of the bobbin 332 or the magnet member 333 of the vibration generator 330 provided in each of the first and second vibration generating modules 300-1 and 300-2 of the vibration generating device 300. For example, with respect to a horizontal cross-sectional length of the vibration generator 330 along the first direction X, a horizontal cross-sectional length of the communication hole 710 may be 40% or less of a horizontal cross-sectional length of the bobbin 332 or the magnet member 333. When the horizontal cross-sectional length of the communication hole 710 is greater than 40%, a balance between a sound transferred (or propagated) to the display module 100 and a sound reflected (or diffracted) in the first gap space GS1 may not be maintained, and due to this, a sound output characteristic of the vibration generating device 300 may be reduced.

The plate 700 according to an embodiment of the present disclosure may be connected or coupled to a second portion 153 of the second supporting member 150 to cover the hole 157 of the second supporting member 150 by a third connection member 600.

The third connection member 600 may be disposed between the first portion 151 of the second supporting member 150 and a periphery portion of the plate 700. The third connection member 600 may place or couple the plate 700 on or to the first portion 151 of the second supporting member 150. The third connection member 600 may include a double-sided tape, a double-sided foam tape, a double-sided foam pad, or a double-sided foam pad tape, which includes an adhesive resin or an adhesive layer, but embodiments are not limited thereto. The adhesive resin or the adhesive layer of the third connection member 600 according to an embodiment of the present disclosure may include an acryl-based or a urethane-based adhesive material, but embodiments are not limited thereto. For example, the adhesive resin or the adhesive layer of the third connection member 600 may include the urethane-based adhesive material having a relatively ductile characteristic compared to the acryl-based adhesive material having a characteristic which is relatively high in hardness, for preventing or minimizing the transfer of a vibration of the display module 100 to the structure 310.

Except for that the vibration generating device 300 is supported by or connected to the plate 700 by the second connection member 400, the vibration generating device 300 may be substantially the same as the vibration generating device 300 illustrated in FIGS. 3 to 10, and thus, its repetitive description is omitted or will be briefly given below.

In the vibration generating device 300, the structure 310 of each of the first and second vibration generating modules 300-1 and 300-2 may be disposed at the plate 700 by the second connection member 400. For example, the structure 310 of each of the first and second vibration generating modules 300-1 and 300-2 may be supported by (or connected to) the plate 700 by the second connection member 400.

In the vibration generating device 300, the vibration generator 330 of each of the first and second vibration generating modules 300-1 and 300-2 may be disposed in a corresponding structure 310 and may output a sound toward the plate 700 and the communication hole 710 of the plate 700. A portion of a sound output from the vibration generator 330 may be transferred to a rear surface of the display module 100 through each of the communication hole 710 of the plate 700 and the hole 157 of the second supporting member 150. And, the other portion of the sound output from the vibration generator 330 may be reflected (or diffracted) in the lateral direction of the display module 100 in the first gap space GS1 between the plate 700 and the vibration generator 330 and in the second gap space GS2 between the plate 700 and a sound guide portion 313 of the structure 310 and may be output in the forward direction of the display module 100 through a sound emission portion 315 of the structure 310.

The second connection member 400 may be disposed between the plate 700 and the structure 310 and may place or couple the structure 310 on or to the plate 700. The second connection member 400 may include a double-sided tape, a double-sided foam tape, a double-sided foam pad, or a double-sided foam pad tape, which includes an adhesive resin or an adhesive layer, but embodiments are not limited thereto.

Therefore, the display apparatus according to another embodiment of the present disclosure may have an effect which is the same as or similar to the display apparatus illustrated in FIGS. 8 to 10. Also, because the display apparatus according to another embodiment of the present disclosure includes the second supporting member 150, including the hole 157 overlapping a magnetic field region of the vibration generating device 300, and the plate 700 disposed between the second supporting member 150 and the vibration generating device 300, the magnetic field distortion of the vibration generating device 300 caused by the second supporting member 150 may be prevented or minimized, and thus, a sound output characteristic of the vibration generating device 300 may be enhanced. Therefore, a sound output characteristic based on a vibration of the vibration generating device 300 may be enhanced. Also, because the display apparatus according to another embodiment of the present disclosure further includes the communication hole 710 which is disposed at the plate 700 to overlap the hole 157 of the second supporting member 150 and to overlap half or less of a magnetic field region formed in the vibration generating device 300, a sound balance may be maintained between a forward sound, traveling in the forward direction of the display module 100, and a lateral sound, traveling in the lateral direction of the display module 100, among sounds generated in the vibration generating device 300, thereby more enhancing a sound output characteristic of the vibration generating device 300. Accordingly, a sound output characteristic based on a vibration of the vibration generating device 300 may be more enhanced.

Figure 14:
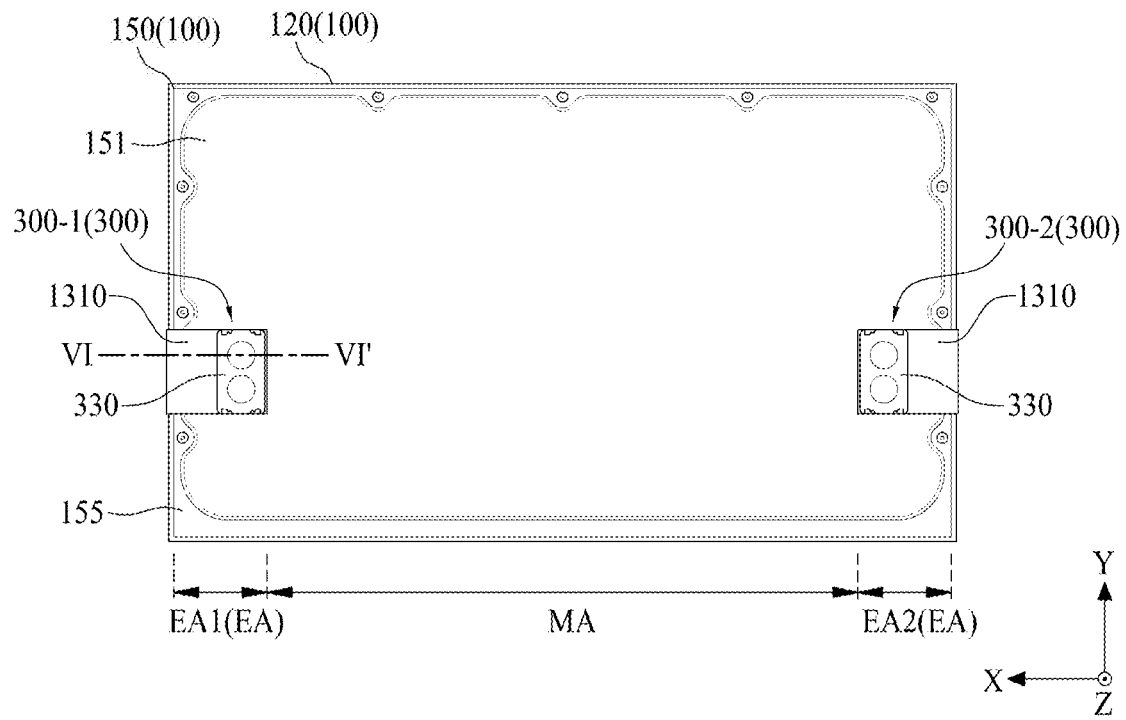
FIG. 14 illustrates a rear surface of a display apparatus according to another embodiment of the present disclosure.
Figure 15:
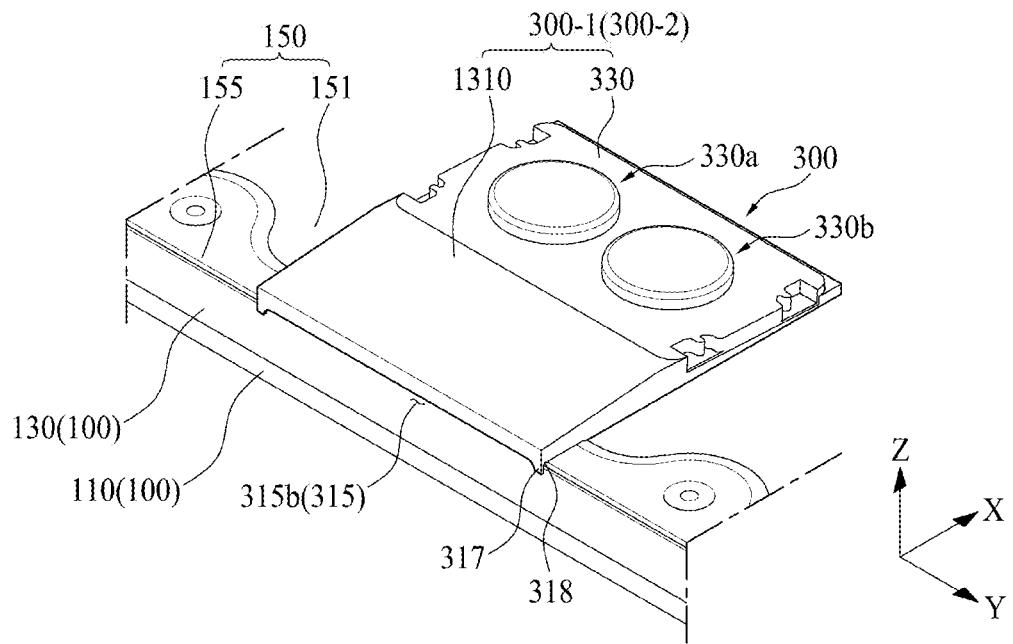
FIG. 15 illustrates a vibration generating device disposed in a second supporting member illustrated in FIG. 14.
Figure 16:
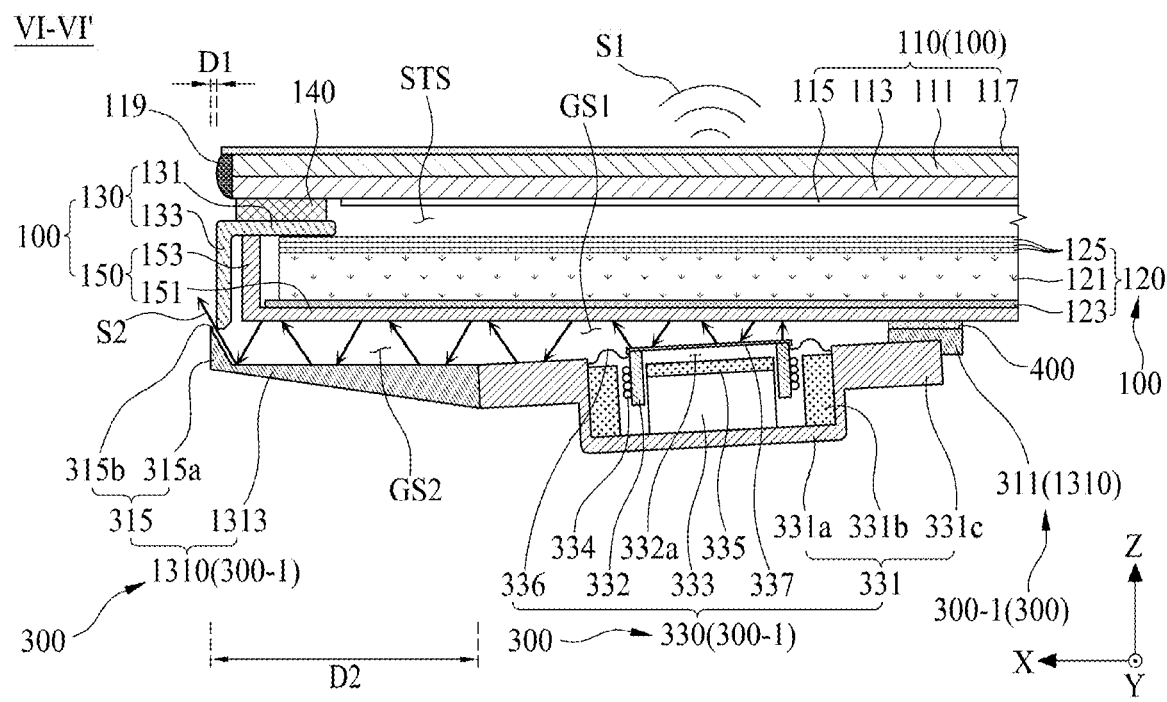
FIG. 16 is a cross-sectional view taken along line VI-VI' illustrated in FIG. 14.

FIG. 14 illustrates a rear surface of a display apparatus according to another embodiment of the present disclosure, FIG. 15 illustrates a vibration generating device disposed in a second supporting member illustrated in FIG. 14, and FIG. 16 is a cross-sectional view taken along line VI-VI' illustrated in FIG. 14. The drawings illustrate an embodiment where a structure of a second generating device is modified in the display apparatus illustrated in FIGS. 3 to 7. In the following description, therefore, a second generating device will be described in detail, the other elements are referred to by the same reference numerals as FIGS. 3 to 5, and their repetitive descriptions are omitted or will be briefly given.

With reference to FIGS. 14 to 16, in the display apparatus according to another embodiment of the present disclosure, a vibration generating device 300 may include first and second vibration generating modules 300-1 and 300-2 disposed at a rear region of a display module 100.

The first vibration generating module 300-1 may be disposed in a first rear periphery region EA1 of the display module 100, and the second vibration generating module 300-2 may be disposed in a second rear periphery region EA2 of the display module 100.

Each of the first and second vibration generating modules 300-1 and 300-2 may include a structure 1310 and a vibration generator 330.

The structure 1310 may be disposed in the rear periphery region EA of the display module 100. The structure 1310 may be supported by (or connected to) the rear periphery region EA of the display module 100 by the second connection member 400.

The structure 1310 may include a supporting portion 311, a sound guide portion 1313, and a sound emission portion 315.

The supporting portion 311 may be configured to support the vibration generator 330. The supporting portion 311 according to an embodiment of the present disclosure may include an inclined supporting surface (or a sloped supporting surface) in nonparallel with a rear surface of the second supporting member 150, and thus, may support the vibration generator 330 so as to be inclined from a rear surface of the display module 100.

The sound guide portion 1313 may extend from the supporting portion 311 along the first direction X and may be disposed in a rear peripheral region of the second supporting member 150. The sound guide portion 1313 according to an embodiment of the present disclosure may guide a sound S2 generated based on a vibration of the vibration generator 330 supported by the supporting portion 311 so that the sound S2 travels in the lateral direction of the display module 100. According to an embodiment of the present disclosure, with respect to a thickness direction Z of the display module 100, a thickness of the sound guide portion 1313 may be thickened progressively from the sound emission portion 315 to the supporting portion 311 along the first direction X. The sound guide portion 1313 may be configured to have a length which is 3 mm or more and 1.2 or less times a total length of the vibration generator 330, in the first direction X. With respect to the first direction X, a shortest distance D2 between one side or a side surface of the display module 100 (or one side or a side surface of the panel guide) and the vibration generator 330 may be adjusted to about 30 mm to about 60 mm. When the shortest distance D2 between the one side or the side surface of the display module 100 (or the one side or the side surface of the panel guide) and the vibration generator 330 is 60 mm or more with respect to the first direction X, a reflection characteristic of a sound of the high-pitched sound band generated between the display module 100 and the vibration generating device 300 may be reduced. According to an embodiment of the present disclosure, a length of the sound guide portion 1313 along the first direction X may more increase than the sound guide portion 313 described above with reference to FIGS. 3 to 5, and thus, may have a thickness which is less than that of the sound guide portion 313 described above with reference to FIGS. 3 to 5. Accordingly, a thickness of a periphery portion of the display apparatus overlapping the periphery region EA of the display module 100 may be more reduced.

The sound emission portion 315 may be provided at one side or an end of the sound guide portion 1313 in parallel with a second direction Y. The sound emission portion 315 may be configured to output a sound S2, traveling via the sound guide portion 1313, in the forward direction of the display module 100. The sound emission portion 315 may include a sound emission guider 315a and a sound emission port 315b, and the elements are as described above with reference to FIGS. 3 to 5 and thus their repetitive descriptions are omitted.

The vibration generator 330 of each of the first and second vibration generating modules 300-1 and 300-2 may be supported by (or coupled to) a corresponding structure 1310 in the first and second vibration generating modules 300-1 and 300-2. The vibration generator 330 may be supported by (or disposed at) the supporting portion 311 so as to be inclined or sloped at an angle of 5 degrees or less with respect to the rear surface of the second supporting member 150. For example, the vibration generator 330 may be inclined by about 1 degree to about 5 degrees with respect to the rear surface of the second supporting member 150.

The vibration generator 330 may include a module frame 331, a bobbin 332, a magnet member 333, and a coil 334, or may further include a center pole 335, and a damper 336, and the elements are as described above with reference to FIGS. 3 to 5 and thus their repetitive descriptions are omitted.

The vibration generator 330 is not limited to the twin type structure illustrated in FIGS. 3 and 4 and may be implemented in a single type structure or may be configured in a 2 or more-array structure. For example, the vibration generator 330 may be configured in a 4-array structure or a 6-array structure.

Therefore, in the display apparatus according to another embodiment of the present disclosure, at least a portion of a sound of the high-pitched sound band among sounds generated based on a vibration of the vibration generating device 300 may be guided in the lateral direction of the display module 100 by the structure 1310 of the vibration generating device 300 and may be output in the lateral direction and the forward direction of the display module 100, and thus, a sound characteristic of the high-pitched sound band may be enhanced by a sound S2 output in the lateral direction of the display module 100. Also, in the display apparatus according to another embodiment of the present disclosure, a thickness of the sound guide portion 1313 of the structure 1310 provided in the vibration generating device 300 may be reduced, and thus, a thickness of a periphery portion, overlapping the periphery region EA, of the display module 100 may be more reduced.

Figure 17:
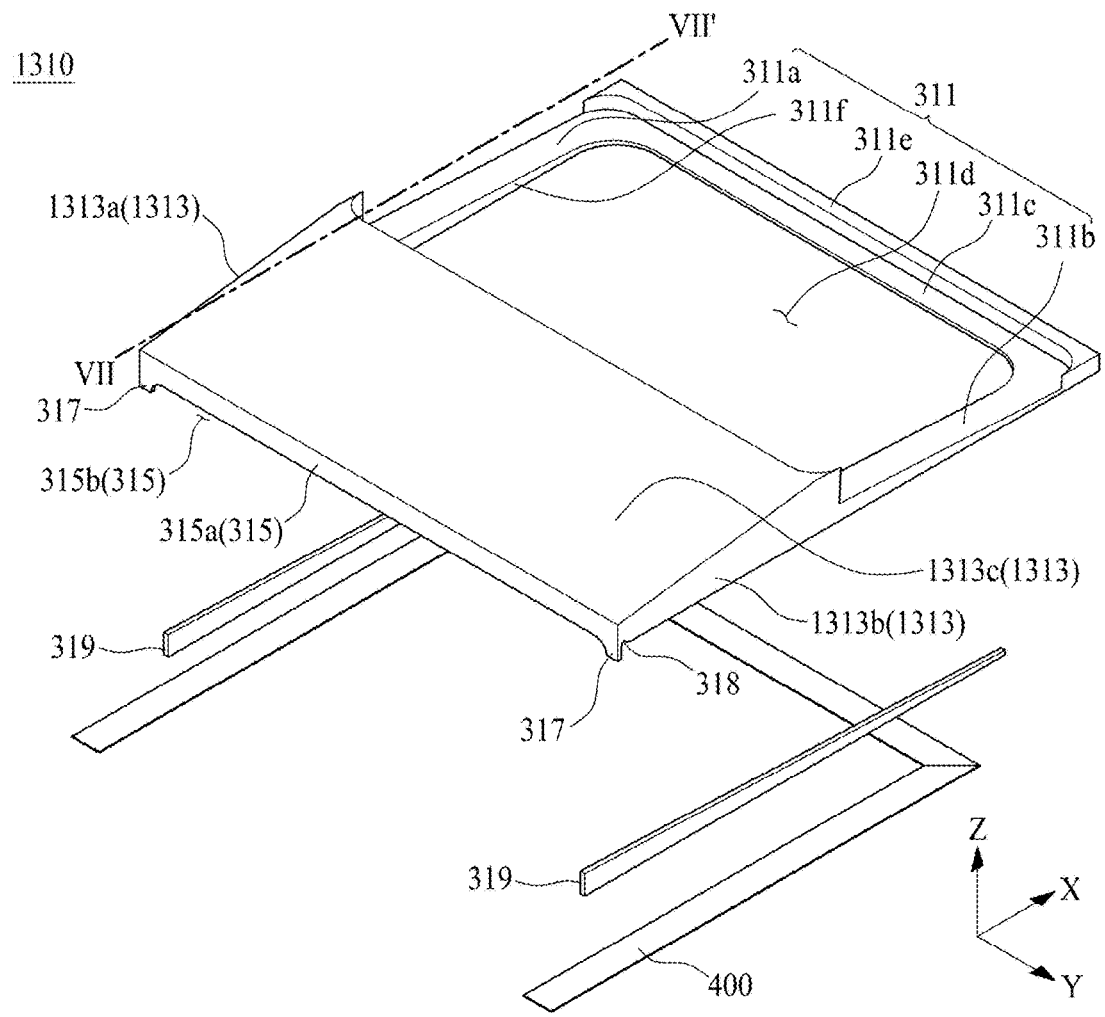
FIG. 17 illustrates a structure of the vibration generating device illustrated in FIGS. 14 to 16.
Figure 18:
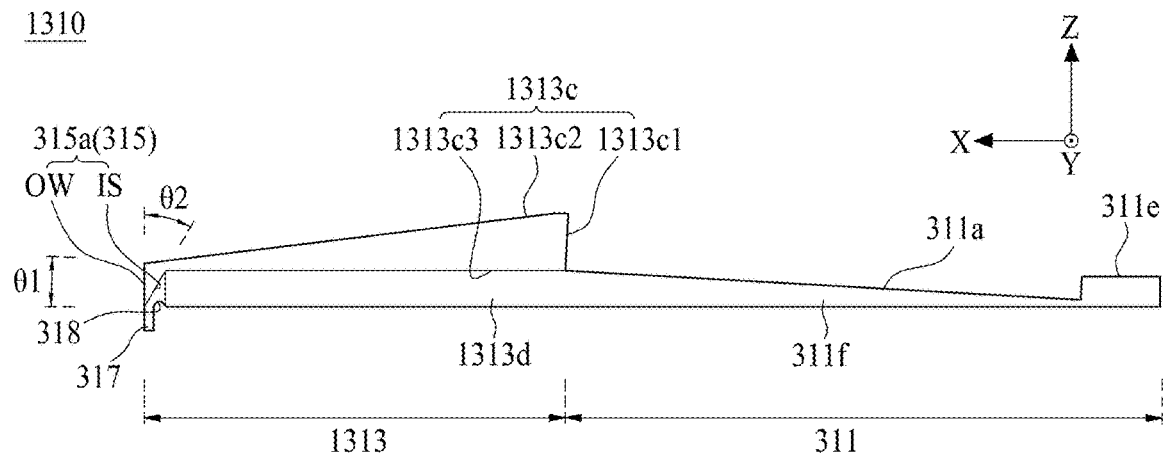
FIG. 18 is a cross-sectional view taken along line VII-VII' illustrated in FIG. 17.

FIG. 17 illustrates a structure of the vibration generating device illustrated in FIGS. 14 to 16, and FIG. 18 is a cross-sectional view taken along line VII-VII' illustrated in FIG. 17.

With reference to FIGS. 15 to 18, a structure 1310 according to another embodiment of the present disclosure may include a supporting portion 311, a sound guide portion 1313, and a sound emission portion 315.

The supporting portion 311 may be supported by (or connected to) a rear region of a second supporting member 150 by a second connection member 400. The supporting portion 311 may include the first to third supporting portions 311a to 311c and the opening portion 311d described above with reference to FIGS. 4 to 8, and the elements are as described above with reference to FIGS. 3 to 8 and thus their repetitive descriptions are omitted. Also, the supporting portion 311 may further include a first stopper 311e. The first stopper 311e is as described above with reference to FIGS. 3 to 8, and thus, its repetitive description is omitted.

The sound guide portion 1313 may extend from the supporting portion 311 along the first direction X. The sound guide portion 1313 may be disposed at a rear peripheral region of the second supporting member 150.

The sound guide portion 1313 may have a first length parallel to the first direction X, a second length parallel to the second direction Y, and a thickness parallel to a third direction Z.

According to an embodiment of the present disclosure, the first length of the sound guide portion 1313 may have a length which is 3 mm or more and 1.2 or less times a total length of the vibration generator 330. In a case where the first portion of the sound guide portion 1313 is less than 3 mm, as a length of a reflection region (or a reflection space) of a sound traveling in the lateral direction of the display module 100 is reduced, a reflection characteristic of a sound of the high-pitched sound band may not be obtained.

The sound guide portion 313 according to an embodiment of the present disclosure may include a first extension portion 1313a, a second extension portion 1313b, and a cover portion 1313c.

The first extension portion 1313a may extend from the first supporting portion 311a of the supporting portion 311 along the first direction X. The second extension portion 1313b may extend from the second supporting portion 311b of the supporting portion 311 in parallel with the first extension portion 1313a.

Each of the first and second extension portions 1313a and 1313b may have a length which is 3 mm or more and 1.2 or less times a length of the vibration generator 330, in the first direction X.

Each of the first and second extension portions 1313a and 1313b may include a first surface and a second surface. The first surface may be adjacent to a rear region of the display module 100. The second surface may be nonparallel to the rear region of the display module 100. The second surface may support the cover portion 1313c. The first surface of each of the first and second extension portions 1313a and 1313b may be parallel to a rear surface of the display module 100. The second surface of each of the first and second extension portions 1313a and 1313b may be opposite to the first surface and may be parallel to the rear surface of the display module 100.

The cover portion 1313c may be disposed on the first extension portion 1313a and the second extension portion 1313b and may cover a space between the first extension portion 1313a and the second extension portion 1313b. A space, which is covered by the cover portion 1313c and is provided between the first extension portion 1313a and the second extension portion 1313b on the rear surface of the display module 100 (or the rear surface of the second supporting member 150), may be a second gap space GS2 connected to (or communicating with) the first gap space GS1 between the rear surface of the display module 100 and the vibration generator 330. A sound output from the vibration generator 330 to the first gap space GS1 may be reflected (or diffracted) once or more in each of the first gap space GS1 and the second gap space GS2 and may travel (or propagate) toward the sound emission portion 315.

The cover portion 1313c according to an embodiment of the present disclosure may have a first length parallel to the first direction X, a second length parallel to the second direction Y, and a thickness parallel to the third direction Z.

A thickness of the cover portion 1313c may be implemented to be reduced progressively toward the one side or the side surface of the display module 100 along the first direction X. Therefore, a thickness of a periphery region EA of the display module 100 may be reduced, and thus, a thickness of a periphery portion of the display apparatus may be reduced.

The cover portion 1313c may include a second stopper 1313c1, a first surface 1313c2, and a second surface 1313c3.

The second stopper 1313c1 may be disposed on the first and second extension portions 1313a and 1313b along the second direction Y and may be configured to define a disposition region of the vibration generator 330 supported by the supporting portion 311. For example, the disposition region of the vibration generator 330 may be defined by the first stopper 311e of the supporting portion 311 and the second stopper 1313c1 of the sound guide portion 1313.

The second stopper 1313c1 according to an embodiment of the present disclosure may surround a side surface of a fourth side of the vibration generator 330 which is supported to be inclined by the supporting portion 311, thereby preventing movement of the vibration generator 330. For example, both periphery portions of the second stopper 1313c1 may include a curved portion corresponding to the curved corner portion of the vibration generator 330.

The first surface 1313c2 may be configured to be inclined or sloped from an uppermost surface of the second stopper 1313c1 to the second surface of each of the first and second extension portions 1313a and 1313b. For example, a distance between the first surface 1313c2 and the rear surface of the display module 100 (or the rear surface of the second supporting member 150) may be reduced progressively toward the one side or the side surface of the display module 100 along the first direction X. For example, an angle between the first surface 1313c2 and the rear surface of the display module 100 (or the rear surface of the second supporting member 150) may be 45 degrees or less, and for example, may be 30 degrees or less. When the angle between the first surface 1313c2 and the rear surface of the display module 100 (or the rear surface of the second supporting member 150) is greater than 45 degrees, a thickness of a periphery portion of a display apparatus may increase due to an increase in thickness of the cover portion 1313c. The first surface 1313c2 may be an outer inclined surface or an inclined surface, but the terms are not limited thereto.

The second surface 1313c3 may be a lower surface of the cover portion 1313c and may be spaced apart from the rear surface of the display module 100 (or the rear surface of the second supporting member 150). The second surface 1313c3 may provide the second gap space GS2 between the rear surface of the display module 100 (or the rear surface of the second supporting member 150) and the cover portion 1313c.

According to an embodiment of the present disclosure, the second surface 1313c3 may be parallel to the rear surface of the display module 100 (or the rear surface of the second supporting member 150). The second surface 1313c3 may be a ceiling surface, but the terms are not limited thereto.

The sound emission portion 315 may be configured to protrude from one side of the sound guide portion 1313. For example, the sound emission portion 315 may be configured to protrude from an end of the sound guide portion 1313 along the third direction Z. The sound emission portion 315 may be configured to output a sound S2, which is reflected (or diffracted) in the first gap space GS1 and the second gap space GS2 and travels in the lateral direction of the display module 100, in the forward direction of the display module 100. The sound emission portion 315 may include a sound emission guider 315a and a sound emission port 315b, and the elements are as described above with reference to FIGS. 3 to 8 and thus their repetitive descriptions are omitted.

The structure 1310 of the vibration generating modules 300-1 and 300-2 according to another embodiment of the present disclosure may further include a protrusion portion 317 and a concave portion 318. The protrusion portion 317 may include a pair of protrusion portions. The protrusion portion 317 may be a corner projection or corner bump, but the terms are not limited thereto. The protrusion portion 317 may protrude from both corner portions of the sound guide portion 1313. The protrusion portion 317 may protrude from a corner portion of both ends of the sound guide portion 1313 along the third direction Z. The concave portion 318 may be configured to be concave between each of the pair of protrusion portions 317 and each of the first extension portion 1313a and the second extension portion 1313b of the sound guide portion 1313. The elements are as described above with reference to FIGS. 3 to 8, and thus, their repetitive descriptions are omitted.

The structure 1310 of each of the vibration generating modules 300-1 and 300-2 according to another embodiment of the present disclosure may further include a sound reflection prevention member 319 which is disposed at a third surface 311f and 1313d of each of the supporting portion 311 and the sound guide portion 1313 parallel to the first direction X, and the elements are as described above with reference to FIGS. 3 to 8 and thus their repetitive descriptions are omitted.

Figure 19:
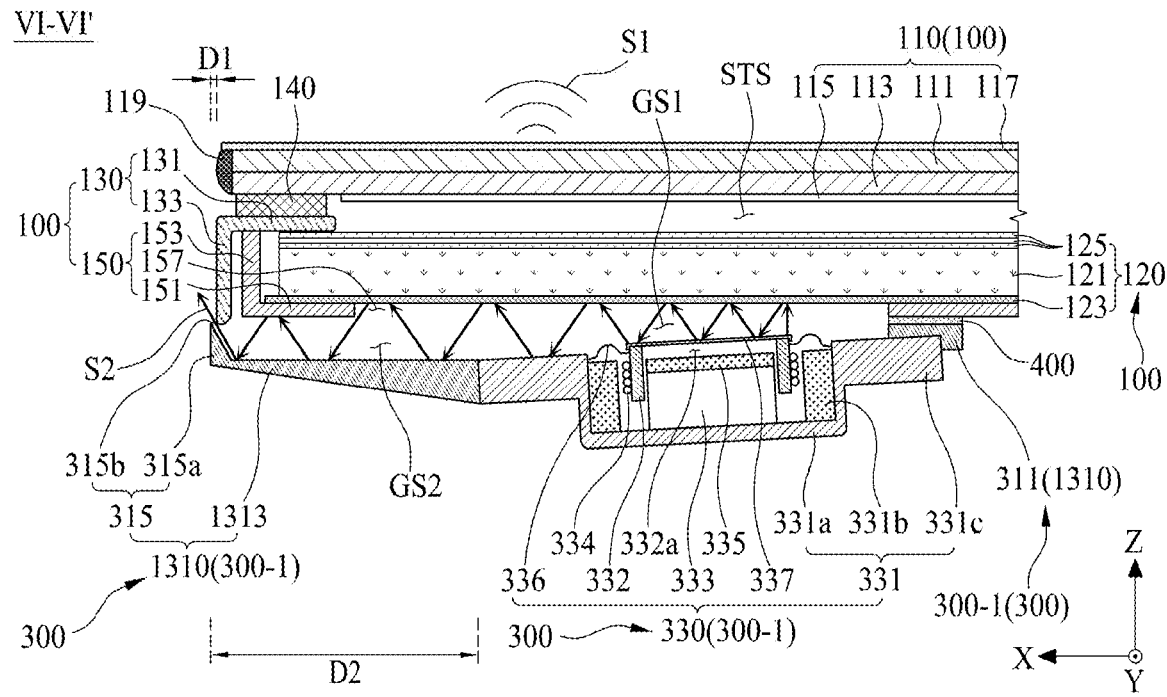
FIG. 19 is another cross-sectional view taken along line VI-VI' illustrated in FIG. 14.

FIG. 19 is another cross-sectional view taken along line VI-VI' illustrated in FIG. 14 and illustrates an embodiment where a structure of a second supporting member is modified in the display apparatus illustrated in FIGS. 14 to 18. In the following description, therefore, a second supporting member will be described in detail, the other elements are referred to by the same reference numerals as FIGS. 14 to 18, and their repetitive descriptions are omitted or will be briefly given.

With reference to FIGS. 14 and 19, in a display apparatus according to another embodiment of the present disclosure, a second supporting member 150 may further include at least one hole 157 which overlaps a vibration generating device 300. For example, the second supporting member 150 may include a material including ferrous metal described above.

According to an embodiment of the present disclosure, the hole 157 may be provided in a first portion 151 to overlap a magnetic field region of the vibration generating device 300. The hole 157 may be provided in the first portion 151 of the second supporting member 150 to overlap a bobbin 332 or a magnet member 333 of the vibration generator 330, for preventing or minimizing a phenomenon where a magnetic field generated in the vibration generating device 300 is distorted by the second supporting member 150 including a metal material. Except for that the hole 157 has a size corresponding to an enlarged length of a sound guide portion 1313 of a structure 1310, the hole 157 may be substantially the same as the hole described above with reference to FIGS. 8 to 10, and thus, its repetitive description is omitted.

According to another embodiment of the present disclosure, the hole 157 may have a size which is greater than that of the bobbin 332 or the magnet member 333 of the vibration generator 330 and may have a size which is less than a total size of the vibration generator 330. For example, the hole 157 may have a size which is greater than or equal to that of the opening portion 311d disposed in the supporting portion 311 of the structure 1310 illustrated in FIG. 17 and is less than that of the supporting portion 311 of the structure 1310. For example, the first portion 151 of the second supporting member 150 may be configured to overlap the sound guide portion 1313 of the structure 1310, and thus, a sound of the high-pitched sound band reflected (or diffracted) in a second gap space GS22 between the first portion 151 of the second supporting member 150 and the sound guide portion 1313 of the structure 1310 may increase, and thus, an output characteristic of a sound output in a lateral direction of the display module 100 may be enhanced.

Therefore, in the display apparatus according to another embodiment of the present disclosure, at least a portion of a sound of the high-pitched sound band among sounds generated based on a vibration of the vibration generating device 300 may be guided in the lateral direction of the display module 100 by the structure 310 of the vibration generating device 300 and may be output in the lateral direction and the forward direction of the display module 100, and thus, a sound characteristic of the high-pitched sound band may be enhanced by a sound S2 output in the lateral direction of the display module 100. Also, because the display apparatus according to another embodiment of the present disclosure includes the second supporting member 150 including the hole 157 overlapping the magnetic field region of the vibration generating device 300, the distortion of a magnetic field of the vibration generating device 300 caused by the second supporting member 150 may be prevented or minimized, and thus, a sound output characteristic of the vibration generating device 300 may be enhanced. Accordingly, a sound output characteristic based on a vibration of the vibration generating device 300 may be enhanced.

Figure 20:
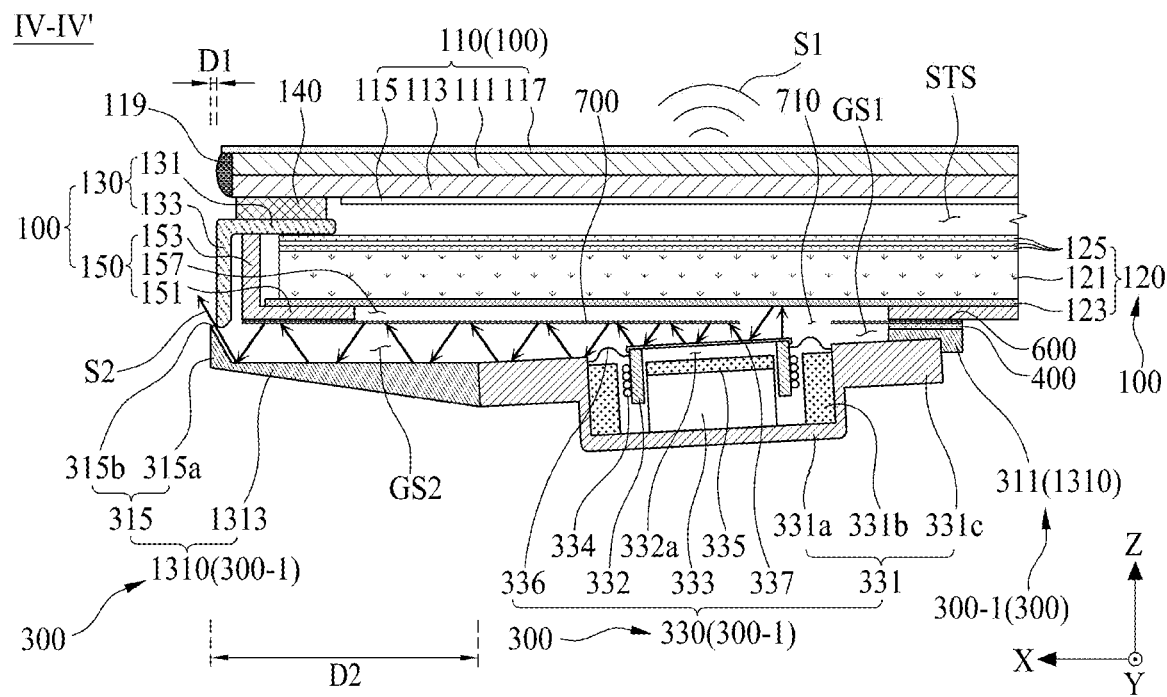
FIG. 20 is another cross-sectional view taken along line VI-VI' illustrated in FIG. 14.

FIG. 20 is another cross-sectional view taken along line VI-VI' illustrated in FIG. 14 and illustrates an embodiment where a plate is additionally provided in the display apparatus illustrated in FIG. 19. In the following description, therefore, a plate will be described in detail, the other elements are referred to by the same reference numerals as FIGS. 14 to 19, and their repetitive descriptions are omitted or will be briefly given.

With reference to FIGS. 14 and 20, a display apparatus according to another embodiment of the present disclosure may further include a plate 700 disposed between a display module 100 and a vibration generating device 300.

The plate 700 may be disposed between a second supporting member 150 and the vibration generating device 300. For example, the plate 700 may be disposed between each of first and second vibration generating modules 300-1 and 300-2 of the vibration generating device 300 and a first portion 151 of the second supporting member 150. The plate 700 may include a material which differs from that of the second supporting member 150. The plate 700 according to an embodiment of the present disclosure may include nonferrous metal. For example, when the plate 700 includes a ferrous metal material, distortion of a magnetic field generated in the vibration generating device 300 may occur. In order to prevent or decrease the magnetic field distortion of the vibration generating device 300 caused by the plate 700, the plate 700 may include a nonferrous metal material. Except for that the plate 700 has a size corresponding to an enlarged length of a sound guide portion 1313 of a structure 1310, the plate 700 may be substantially the same as the plate described above with reference to FIGS. 11 to 13, and thus, its repetitive description is omitted.

The plate 700 according to an embodiment of the present disclosure may further include a communication hole 710.

The communication hole 710 may overlap a hole 157 disposed in the second supporting member 150. The communication hole 710 may communicate the hole 157 disposed in the second supporting member 150 and the first gap space GS1. According to an embodiment of the present disclosure, to maintain a balance of a sound generated in the vibration generating device 300, the communication hole 710 may overlap only a portion of a magnetic field region formed in the vibration generating device 300. The communication hole 710 may overlap half or less of the magnetic field region formed in the vibration generating device 300. For example, with respect to a horizontal cross-sectional length of the vibration generator 330 along the first direction X, a horizontal cross-sectional length of the communication hole 710 may be 40% or less of a horizontal cross-sectional length of a bobbin 332 or a magnet member 333. The communication hole 710 may be substantially the same as the communication hole described above with reference to FIGS. 11 to 13, and thus, its repetitive description is omitted.

Therefore, the display apparatus according to another embodiment of the present disclosure may have the same effect as that of the display apparatus illustrated in FIG. 19. Also, because the display apparatus according to another embodiment of the present disclosure includes the second supporting member 150, including the hole 157 overlapping a magnetic field region of the vibration generating device 300, and the plate 700 disposed between the second supporting member 150 and the vibration generating device 300, the magnetic field distortion of the vibration generating device 300 caused by the second supporting member 150 may be prevented or minimized, and thus, a sound output characteristic of the vibration generating device 300 may be enhanced. Therefore, a sound output characteristic based on a vibration of the vibration generating device 300 may be enhanced. Also, because the display apparatus according to another embodiment of the present disclosure further includes the communication hole 710 which is disposed in the plate 700 to overlap the hole 157 of the second supporting member 150 and to overlap half or less of a magnetic field region formed in the vibration generating device 300, a sound balance may be maintained between a forward sound, traveling in the forward direction of the display module 100, and a lateral sound, traveling in the lateral direction of the display module 100, among sounds generated in the vibration generating device 300, thereby more enhancing a sound output characteristic of the vibration generating device 300. Accordingly, a sound output characteristic based on a vibration of the vibration generating device 300 may be more enhanced.

Figure 21:
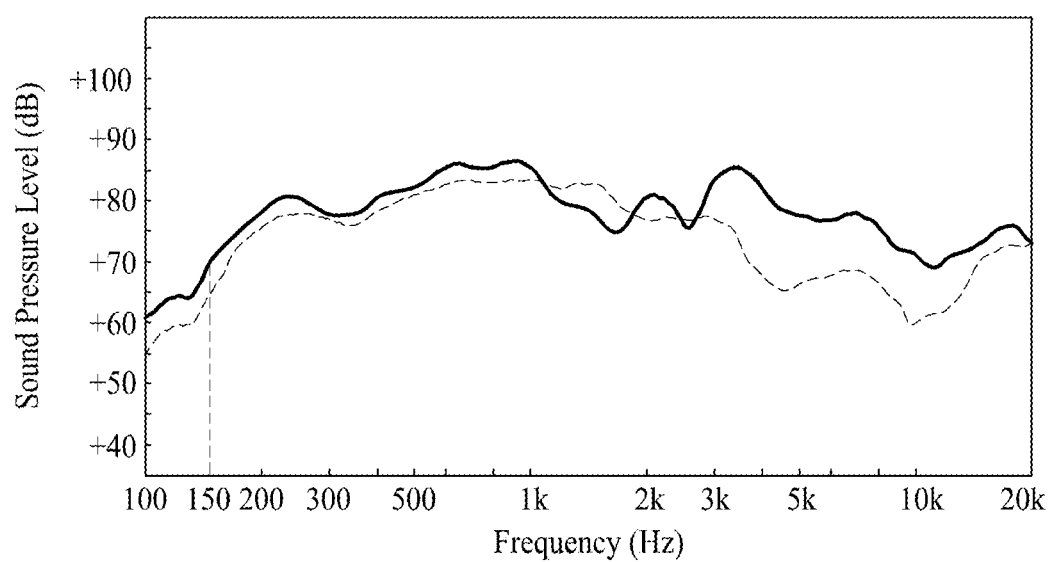
FIG. 21 is a graph showing a sound output characteristic of a display apparatus according to an embodiment of the present disclosure and a sound output characteristic of a display apparatus according to a comparative example.

FIG. 21 is a graph showing a sound output characteristic of a display apparatus according to an embodiment of the present disclosure and a sound output characteristic of a display apparatus according to a comparative example. In FIG. 21, a thick solid line represents a frequency-sound pressure level characteristic of the display apparatus according to an embodiment illustrated in FIG. 5, and a dotted line represents a frequency-sound pressure level characteristic of a display apparatus (or the display apparatus of the comparative example) including a vibration generator which is adjacent to one side or a side surface of a second supporting member and is disposed spaced apart from the second supporting member by less than 3 mm by a connection member without a structure according to the present disclosure. In FIG. 21, the abscissa axis represents a frequency (Hz), and the ordinate axis represents a sound pressure level (dB). In the sound pressure level measurement of FIG. 21, Audio Precision company's APX525 has been used, an applied voltage is 3 Vrms, a sine sweep has been applied at 20 Hz to 20 kHz, and a sound pressure level has been measured at a position being spaced apart from a display panel by 0.5 m. The sine sweep may be a process of performing a sweep for a short time, but a process is not limited thereto.

With reference to FIG. 21, comparing with the display apparatus of the comparative example, it may be seen that, in the display apparatus according to an embodiment of the present disclosure, a sound pressure level is enhanced in 3 kHz or more which is the high-pitched sound band. For example, comparing with the display apparatus of the comparative example, it may be seen that, in the display apparatus according to an embodiment of the present disclosure, a sound pressure level is enhanced by about 10 dB in a sound band of 3 kHz to 10 kHz. Also, comparing with the display apparatus of the comparative example, it may be seen that, in the display apparatus according to an embodiment of the present disclosure, a sound pressure level is enhanced in 1 kHz or less. Accordingly, comparing with the display apparatus of the comparative example, it may be seen that, in the display apparatus of FIG. 5, a sound pressure level characteristic and a sound characteristic of the high-pitched sound band are enhanced.

Moreover, with respect to a sound pressure level of about 70 dB or more, the display apparatus according to an embodiment of the present disclosure has a frequency band of 150 Hz to 20 kHz, and thus, comparing with the display apparatus of the comparative example having a frequency band of 180 Hz to 20 kHz, it may be seen that, in the display apparatus according to an embodiment of the present disclosure, a frequency band increases by about 30 Hz. Accordingly, comparing with the display apparatus of the comparative example, it may be seen that, in the display apparatus of FIG. 5, a sound pressure level characteristic and a sound characteristic of the low-pitched sound band are enhanced.

Therefore, in the display apparatus according to an embodiment of the present disclosure, it may be seen that a sound of the high-pitched sound band is enhanced. For example, the present disclosure may provide a display apparatus including a vibration generating device, which may output a sound of the high-pitched sound band even without configuring a piezoelectric vibration device where an output of the high-pitched sound band is strong. Accordingly, the embodiments of the present disclosure may provide a display apparatus including a vibration generating device, which may enhance a sound of the low-pitched sound band to the high-pitched sound band.

The display apparatus according to an embodiment of the present disclosure may be applied to various applications which output a sound based on a vibration of a display module without a separate speaker. The display apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the vibration generating device according to the present disclosure may be applied to organic light emitting lighting apparatuses or inorganic light emitting lighting apparatuses. When the vibration generating device of the present disclosure is applied to a lighting apparatuses, the vibration generating device may act as lighting and a speaker. Also, when the display apparatus of the present disclosure is applied to a mobile device, the vibration generating device may act as one or more of a speaker, a receiver, and a haptic, but embodiments of the present disclosure are not limited thereto.

A display apparatus according to an embodiment of the present disclosure will be described below.

According to some embodiment of the present disclosure, a display apparatus may include a display module including a display panel configured to display an image, a structure on a rear surface of the display module, and a vibration generator configured to be disposed in the structure in nonparallel with the rear surface of the display module.

According to some embodiments of the present disclosure, the structure may include a supporting portion configured to support the vibration generator, a sound guide portion extending from the supporting portion to one side of the display module, and a sound emission portion protruding from one side of the sound guide portion.

According to some embodiments of the present disclosure, the supporting portion may include an opening portion overlapping the vibration generator.

According to an embodiment of the present disclosure, a display apparatus may include a display module including a display panel configured to display an image, a first vibration generating module in a first rear region of the display module, and a second vibration generating module in a second rear region of the display module. Each of the first and second vibration generating modules comprises a vibration generator configured to output a sound to a rear surface of the display module, and a structure on the rear surface of the display module and configured to output the sound output from the vibration generator to one side of the display module.

According to some embodiment of the present disclosure, the vibration generator may be in nonparallel with the rear surface of the display module.

According to some embodiments of the present disclosure, the structure may include a supporting portion configured to support the vibration generator, a sound guide portion extending from the supporting portion to a side surface of the display module, and a sound emission portion protruding from one side of the sound guide portion.

According to some embodiments of the present disclosure, a distance between a rear surface of the display module and the vibration generator may increase progressively toward one side of the display module along a first direction.

According to some embodiments of the present disclosure, a length of the sound guide portion may be 3 mm or more and 1.2 or less times a total length of the vibration generator with respect to a first direction.

According to some embodiments of the present disclosure, a thickness of the sound guide portion may increase progressively from the sound emission portion to the supporting portion along a first direction.

According to some embodiments of the present disclosure, the sound emission portion may include a protrusion portion. For example, the sound guide portion may include a triangular protrusion tip or a triangular protrusion portion.

According to some embodiment of the present disclosure, the sound emission portion may further include a concave portion.

According to some embodiments of the present disclosure, the supporting portion may include a first supporting portion disposed along a first direction and configured to support a first side of the vibration generator, a second supporting portion in parallel with the first supporting portion and configured to support a second side of the vibration generator, a third supporting portion between one side of the first supporting portion and one side of the second supporting portion and configured to support a third side of the vibration generator, and an opening portion surrounded by the first to third supporting portions.

According to some embodiment of the present disclosure, the supporting portion may further comprise a first stopper disposed at the third supporting portion and configured to define a disposition region of the vibration generator.

According to some embodiments of the present disclosure, each of the first supporting portion and the second supporting portion may include a first surface adjacent to the rear surface of the display module, and a second surface nonparallel to the rear surface of the display module.

According to some embodiments of the present disclosure, in each of the first supporting portion and the second supporting portion, a distance between the first surface and the second surface may increase progressively from the third supporting portion to the sound guide portion along the first direction.

According to some embodiment of the present disclosure, the structure may support the vibration generator. For example, the structure may output sound output from the vibration generator toward a lateral direction of a display module.

According to some embodiments of the present disclosure, a structure may be disposed on a rear surface of a display module by a connection member.

According to some embodiments of the present disclosure, a sound based on a sound pressure level output from a vibration generator may be output in a forward direction and a lateral direction of a display module.

According to some embodiments of the present disclosure, the sound guide portion may extend from the supporting portion to the side surface of the display module in a first direction. For example, the sound emission portion may protrude from an end of the sound guide portion in a thickness direction of the display module.

According to some embodiments of the present disclosure, the sound guide portion may include a first extension portion extending from the first supporting portion to one side of the display module along the first direction, a second extension portion extending from the second supporting portion to the one side of the display module, and a cover portion covering a space between the first extension portion and the second extension portion.

According to some embodiments of the present disclosure, the cover portion may comprise a second stopper disposed on the first and second extension portions and configured to define a disposition region of the vibration generator, a first surface being an outer inclined surface or an inclined surface, and a second surface being a ceiling surface.

According to some embodiments of the present disclosure, the cover portion may include a surface nonparallel to the rear surface of the display module.

According to some embodiments of the present disclosure, the structure may further include a pad disposed at each of a third surface of each of the first and second supporting portions and a third surface of each of the first and second extension portions.

According to some embodiments of the present disclosure, the sound emission portion may include a sound emission guider protruding from one side of the sound guide portion, and a sound emission port between the sound emission guider and the display module.

According to some embodiments of the present disclosure, the sound emission guider may include a first surface protruding from one side of the sound guide portion in a thickness direction of the display module, the first surface being exposed at one side of the display module; and a second surface inclined from the first surface adjacent to the display module.

According to some embodiments of the present disclosure, in the sound emission guider, an angle between the first surface and the second surface may be within a range of 45 degrees to 75 degrees.

According to some embodiments of the present disclosure, a distance between the first surface of the sound emission guider and the one side of the display module with respect to the first direction may be 1±0.5 mm or less, or a shortest distance between the first surface of the sound emission guider and the display module with respect to a thickness direction of the display module may be about ±0.5 mm.

According to some embodiments of the present disclosure, the display module may further include a second supporting member on a rear surface of the display panel and configured to support the structure, and the second supporting member may include a first hole overlapping the vibration generator.

According to some embodiments of the present disclosure, the second supporting member may include a nonferrous metal.

According to some embodiments of the present disclosure, the display apparatus may further comprise a connection member disposed between a first portion of the second supporting member and the structure and including an opening portion.

According to some embodiments of the present disclosure, the display apparatus may further include a plate between the second supporting member and the structure and configured to cover the first hole of the second supporting member.

According to some embodiments of the present disclosure, the plate may include a nonferrous metal.

According to some embodiments of the present disclosure, the plate may further include a second hole overlapping the first hole of the second supporting member.

According to some embodiments of the present disclosure, a shape of the second hole may differ from a shape of the first hole, or a size of the second hole may be less than a size of the first hole.

According to some embodiments of the present disclosure, the vibration generator may include a module frame in the structure, a bobbin on the module frame, a magnet inside or outside the bobbin, a coil wound around the bobbin, and a damper between the module frame and the bobbin.

According to some embodiments of the present disclosure, the display module may further include a second supporting member disposed on the rear surface of the display panel, the second supporting member may include a hole, and a size of the hole may be greater than a size of the bobbin.

According to some embodiments of the present disclosure, the display apparatus may further include a plate between the rear surface of the display module and the structure, the display module may further include a second supporting member on the rear surface of the display panel, and the second supporting member may include a hole.

According to some embodiments of the present disclosure, the plate may further include a second hole overlapping a portion of the bobbin.

According to some embodiments of the present disclosure, a horizontal cross-sectional length of the second hole may be 40% or less of a horizontal cross-sectional length of the bobbin, with respect to a horizontal cross-sectional length along the first direction.

According to some embodiments of the present disclosure, the display apparatus may further comprise a first supporting member including a first portion configured to cover a rear surface of the display module, a second portion configured to surround a side surface of the display module, and a third portion configured to be inclined or sloped in a direction from the first portion to the second portion and to overlap a periphery of the first and second vibration generating modules.

According to some embodiments of the present disclosure, the first and second vibration generating modules may be disposed to be symmetrical or asymmetrical with respect to a first direction of the display module.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus, comprising:
    a display module including a display panel configured to display an image;
    a structure on a rear surface of the display module; and
    a vibration generator configured to be disposed in the structure in nonparallel with the rear surface of the display module,
    wherein a distance between the rear surface of the display module and the vibration generator increases progressively toward one side of the display module in a direction from a center region of the display module to a periphery region of the display module.

2. The display apparatus of claim 1, wherein the structure comprises:
    a supporting portion configured to support the vibration generator;
    a sound guide portion extending from the supporting portion to one side of the display module; and
    a sound emission portion protruding from one side of the sound guide portion.

3. The display apparatus of claim 2, wherein the supporting portion comprises an opening portion overlapping the vibration generator.

4. The display apparatus of claim 2, wherein a length of the sound guide portion is 3 mm or more and 1.2 or less times a total length of the vibration generator with respect to a first direction.

5. The display apparatus of claim 2, wherein a thickness of the sound guide portion increases progressively from the sound emission portion to the supporting portion in the direction from the center region to the periphery region of the display module.

6. The display apparatus of claim 2, wherein the sound emission portion comprises a protrusion portion.

7. The display apparatus of claim 6, wherein the sound emission portion further comprises a concave portion.

8. The display apparatus of claim 2, wherein the supporting portion comprises:
    a first supporting portion disposed along a first direction and configured to support a first side of the vibration generator;
    a second supporting portion in parallel with the first supporting portion and configured to support a second side of the vibration generator;
    a third supporting portion between one side of the first supporting portion and one side of the second supporting portion and configured to support a third side of the vibration generator; and
    an opening portion surrounded by the first to third supporting portions.

9. The display apparatus of claim 8, wherein the supporting portion further comprises:
    a first stopper disposed at the third supporting portion and configured to define a disposition region of the vibration generator.

10. The display apparatus of claim 8, wherein each of the first supporting portion and the second supporting portion comprises:
    a first surface adjacent to the rear surface of the display module; and
    a second surface nonparallel to the rear surface of the display module.

11. The display apparatus of claim 10, wherein, in each of the first supporting portion and the second supporting portion, a distance between the first surface and the second surface increases progressively from the third supporting portion to the sound guide portion in the direction from the center region to the periphery region of the display module.

12. The display apparatus of claim 8, wherein the sound guide portion comprises:
    a first extension portion extending from the first supporting portion to one side of the display module along the first direction;
    a second extension portion extending from the second supporting portion to the one side of the display module; and
    a cover portion covering a space between the first extension portion and the second extension portion.

13. The display apparatus of claim 12, wherein the cover portion comprises:
    a second stopper disposed on the first and second extension portions and configured to define a disposition region of the vibration generator;
    a first surface being an outer inclined surface or an inclined surface; and
    a second surface being a ceiling surface.

14. The display apparatus of claim 12, wherein the cover portion comprises a surface nonparallel to the rear surface of the display module.

15. The display apparatus of claim 12, wherein the structure further comprises a pad disposed at each of a third surface of each of the first and second supporting portions and a third surface of each of the first and second extension portions.

16. The display apparatus of claim 2, wherein the sound emission portion comprises:
    a sound emission guider protruding from one side of the sound guide portion; and a sound emission port between the sound emission guider and the display module.

17. The display apparatus of claim 16, wherein the sound emission guider comprises:
 a first surface protruding from one side of the sound guide portion in a thickness direction of the display module, the first surface being exposed at one side of the display module; and
 a second surface inclined from the first surface adjacent to the display module.

18. The display apparatus of claim 17, wherein, in the sound emission guider, an angle between the first surface and the second surface is within a range of 45 degrees to 75 degrees.

19. The display apparatus of claim 17, wherein a distance between the first surface of the sound emission guider and the one side of the display module with respect to a first direction is 1±0.5 mm or less, or a shortest distance between the first surface of the sound emission guider and the display module with respect to a thickness direction of the display module is about ±0.5 mm.

20. The display apparatus of claim 1, wherein:
 the display module further comprises a second supporting member on a rear surface of the display panel and configured to support the structure, and
 the second supporting member comprises a first hole overlapping the vibration generator.

21. The display apparatus of claim 20, wherein the second supporting member includes a nonferrous metal.

22. The display apparatus of claim 20, further comprising:
 a connection member disposed between a first portion of the second supporting member and the structure and including an opening portion.

23. The display apparatus of claim 20, further comprising a plate between the second supporting member and the structure and configured to cover the first hole of the second supporting member.

24. The display apparatus of claim 23, wherein the plate comprises a nonferrous metal.

25. The display apparatus of claim 23, wherein the plate further comprises a second hole overlapping the first hole of the second supporting member.

26. The display apparatus of claim 25, wherein a shape of the second hole differs from a shape of the first hole, or a size of the second hole is less than a size of the first hole.

27. The display apparatus of claim 1, wherein the vibration generator comprises:
 a module frame in the structure;
 a bobbin on the module frame;
 a magnet inside or outside the bobbin;
 a coil wound around the bobbin; and
 a damper between the module frame and the bobbin.

28. The display apparatus of claim 27, wherein:
 the display module further comprises a second supporting member disposed on a rear surface of the display panel,
 the second supporting member comprises a hole, and
 a size of the hole is greater than a size of the bobbin.

29. The display apparatus of claim 27, further comprising a plate between the rear surface of the display module and the structure,
 wherein the display module further comprises a second supporting member on the rear surface of the display panel, and
 wherein the second supporting member comprises a hole.

30. The display apparatus of claim 29, wherein the plate further comprises a second hole overlapping a portion of the bobbin.

31. The display apparatus of claim 30, wherein a horizontal cross-sectional length of the second hole is 40% or less of a horizontal cross-sectional length of the bobbin, with respect to a horizontal cross-sectional length along the first direction.

32. A display apparatus, comprising:
 a display module including a display panel configured to display an image;
 a first vibration generating module in a first rear region of the display module; and
 a second vibration generating module in a second rear region of the display module, wherein each of the first and second vibration generating modules comprises:
  a vibration generator configured to output a sound to a rear surface of the display module; and
  a structure on the rear surface of the display module and configured to output the sound output from the vibration generator to one side of the display module, and
 wherein a distance between the rear surface of the display module and the vibration generator increases progressively toward one side of the display module in a direction from a center region of the display module to a periphery region of the display module.

33. The display apparatus of claim 32,
 wherein the vibration generator is in nonparallel with the rear surface of the display module.

34. The display apparatus of claim 32, wherein the structure comprises:
 a supporting portion configured to support the vibration generator;
 a sound guide portion extending from the supporting portion to a side surface of the display module; and
 a sound emission portion protruding from one side of the sound guide portion.

35. The display apparatus of claim 32, further comprising:
 a first supporting member including a first portion configured to cover the rear surface of the display module, a second portion configured to surround a side surface of the display module, and a third portion configured to be inclined or sloped in a direction from the first portion to the second portion and to overlap a periphery of the first and second vibration generating modules.

36. The display apparatus of claim 32, wherein the first and second vibration generating modules are disposed to be symmetrical or asymmetrical with respect to a first direction of the display module.

* * * * *